United States Patent [19]

Von Fahnestock et al.

[11] Patent Number: 5,451,523
[45] Date of Patent: Sep. 19, 1995

[54] APPARATUS FOR COMPOSTING ORGANIC WASTE MATERIAL

[75] Inventors: J. Nicholas Von Fahnestock, Trotwood; Buford C. McCusker, Farmersville, both of Ohio

[73] Assignee: Ag Renu, Inc., Middletown, Ohio

[21] Appl. No.: 114,779

[22] Filed: Aug. 31, 1993

Related U.S. Application Data

[63] Continuation-in-part of Ser. No. 962,158, Oct. 5, 1992, abandoned, which is a continuation of Ser. No. 621,807, Dec. 4, 1990, abandoned.

[51] Int. Cl.⁶ ............ C12M 1/36; C12M 1/38; C12M 1/10; C05F 17/02
[52] U.S. Cl. .................. 435/290; 435/289; 435/299; 435/312; 435/313; 422/184
[58] Field of Search ........... 435/299, 312, 313, 303, 435/307, 289, 290; 422/184, 209, 233; 71/9

[56] References Cited

U.S. PATENT DOCUMENTS

| | | |
|---|---|---|
| 2,220,134 | 11/1940 | Townsend. |
| 3,640,969 | 2/1972 | Suzuki et al.. |
| 3,676,074 | 7/1972 | Shibayama et al. ............ 422/209 |
| 3,926,737 | 12/1975 | Wilson et al. ............ 435/289 |
| 3,926,738 | 12/1975 | Wilson et al. ............ 435/289 |
| 4,062,770 | 12/1977 | Kneer ............ 422/184 |
| 4,064,015 | 12/1977 | Nyiri et al.. |
| 4,099,336 | 7/1978 | Maffet. |
| 4,161,426 | 7/1979 | Kneer ............ 435/313 |
| 4,193,206 | 3/1980 | Maffet. |
| 4,223,094 | 9/1980 | Vaseen ............ 435/313 |
| 4,230,676 | 10/1980 | Taylor et al. ............ 435/289 |
| 4,245,396 | 1/1981 | Maffet. |
| 4,251,255 | 2/1981 | Wagner et al.. |
| 4,255,389 | 3/1981 | Jung et al. ............ 422/184 |
| 4,374,804 | 2/1983 | Easter, II ............ 422/184 |
| 4,384,877 | 5/1983 | Nemetz. |
| 4,393,166 | 7/1983 | Reischl et al.. |
| 4,486,216 | 12/1984 | von Raven et al.. |
| 4,798,802 | 1/1989 | Ryan. |

FOREIGN PATENT DOCUMENTS

| | | |
|---|---|---|
| 3736889 | 6/1988 | Germany. |
| 62-167278 | 7/1987 | Japan. |
| 1557145 | 4/1990 | U.S.S.R.. |

Primary Examiner—James C. Housel
Assistant Examiner—Jan M. Ludlow
Attorney, Agent, or Firm—Frost & Jacobs

[57] ABSTRACT

Apparatus for preparing stable humus from a batch of organic waste material. The apparatus has an elongated drum-like reactor vessel and a prime mover operatively connected thereto to rotate the reactor vessel about its axis. At least one non-rotating sensor wand within the reactor vessel for sensing temperature and collecting gas samples within and substantially across the volume of the reactor vessel and within and substantially across the volume of the waste material. The sensor wand is connected to a gas analyzer and a temperature monitor. The reactor vessel has affixed to its inside surface a longitudinal manifold, with pairs of aeration pipes extending to other side thereof and evenly spaced therealong. A variable speed blower has an outlet operatively connected to the manifold. A process control computer has inputs from the gas analyzer and the temperature monitor and outputs to control the prime mover and the variable speed blower. A central computer monitor has an output to the process control computer to down-load thereto the rules for the batch being processed, and a pair of inputs from the process control computer to receive temperature and gas information therefrom.

18 Claims, 9 Drawing Sheets

APPARATUS FOR COMPOSTING ORGANIC WASTE MATERIAL

REFERENCE TO RELATED APPLICATIONS

The present application is a continuation-of-part of U.S. application Ser. No. 07/962,158, filed Oct. 5, 1992, in the name of the same inventors, and entitled: METHOD OF COMPOSTING ORGANIC WASTE MATERIAL, RELATED APPARATUS AND HUMUS PRODUCT, now abandoned, which is a continuation of Ser. No. 07/621,807, filed Dec. 4, 1990, in the name of the same inventors, and entitled: METHOD OF COMPOSTING ORGANIC WASTE MATERIAL, RELATED APPARATUS AND HUMUS PRODUCT, now abandoned.

BACKGROUND

The present invention relates to a method of preparing humus, particularly stable humus, from organic waste material, and the humus product thereof. The invention also relates to an apparatus for performing this method.

An increasingly pressing problem in the area of waste disposal exists due to the rising costs of and limited space for landfills. Waste management companies and municipalities continue to search for viable alternatives. These include recycling, incineration and composting.

The common goal of waste treatment and recycling methods is to process waste safely and at a low cost, while using as much of the waste as possible to produce useful products. The more waste is transformed into usable products or energy, the less volume of the original waste remains to be disposed. Waste management alternatives to landfills seek to maximize waste conversion and minimize costs.

Recycling allows valuable raw materials such as paper, glass, aluminum and iron to be recovered from waste and reused. The benefits of recycling include a reduction of waste volume, conservation of raw materials, reduced toxicity within the environment and conservation of valuable land otherwise required for landfills. The major problem with respect to recycling is that recyclable waste must be separated before it can be processed. The public is not yet conditioned to methodically separate all recyclable waste from the non-recyclable waste.

The second alternative in consideration, is often seen as the easy alternative to landfills. The waste is simply burned and the bound energy recovered. Though effective in reducing waste volume, these methods are expensive in terms of high capital costs, the high costs of maintenance, the control of dangerous and/or toxic emissions, and disposal of the residual ash. The danger to the environment posed by incineration and the expense are often too great to be outweighed by the gains in energy and waste reduction.

The third alternative is composting. This natural process offers a reduction in the volume of organic waste while producing natural fertilizer in the form of humus. Since only organic material can be composted, separation of non-organic waste is required. Traditional composting techniques such as "windrowing", takes up to one year to transform all organic waste into humus. Several existing techniques attempt to increase the composting efficiency so that humus can be obtained in three to four months. Examples of these techniques are those that use tunnel-type reactors and screening systems as well as large digester systems.

Most of the techniques for increasing composting efficiency involve the use of apparatus that require a large area to complete the conversion of the organic waste material to humus. The separation involved and the time and space requirements to complete the composting are drawbacks that have limited the use of composting on a large industrial scale.

Other composting techniques have used reactors to maintain the microbial growth in the organic waste material. However, such reactor techniques have suffered from an inability to maintain an optimum growth environment throughout the mass of the organic waste material. This is due in part to the packing of the organic waste material which prevents sufficient reaction to allow efficient microbial respiration. Another disadvantage arises from the failure to control the temperature throughout the organic material. An example of a prior art reactor is disclosed in U.S. Pat. No. 3,930,799 to Eweson, which is hereby incorporated herein by reference.

It is therefore desirable to develop a high efficiency composting system which requires less time and curing area to produce a high quality humus product.

The present invention relates to a method and related apparatus for producing a consistently high quality humus product with greater throughput over time, which translates to greater efficiency. This results largely from reduced reactor retention time made possible by the present invention. The humus product of the present invention is stable and can be specially applied to enrich soil in household and/or industrial agriculture environments.

SUMMARY OF THE INVENTION

Toward the accomplishment of the foregoing advantages and the solution to the above-described problems of the prior art, the invention comprises a method of preparing humus, an apparatus that may be used to practice the inventive method, and the humus product produced by the inventive method.

The present invention makes possible the optimization and control of the environment for microbial growth through the mass of the organic waste material being processed.

The most important environmental parameters to be controlled and optimized are temperature, moisture/humidity, oxygen content and carbon dioxide content. Measurable microbial activity begins at about 4.4° C. to about 10° C. (about 40° F. to about 50° F.). The temperature should be maintained above a minimum threshold value of 45° C. to 55° C. (about 113° F. to about 131° F.). It is preferred to allow the temperature to rise very rapidly (8 to 10 hours) to above about 70° C. to about 80° C. (about 158° F. to about 176° F.) and later fall to and stabilize at temperatures of about 60° C. to about 61° C. (about 140° F. to about 142° F.). Allowing the temperature to rise briefly to from about 70° C. to about 80° C. (about 158° F. to about 176° F.) is sufficient to destroy pathogens and halt most seed germination. At extended elevated temperatures, non-microbial oxidation may occur leading to a lower quality humus product.

The moisture/humidity content is important to microbial growth and is maintained preferably in the agrokinetics process at about 50% to about 55% of the organic waste material growth medium. Moisture should not be at such a level that a liquid suspension is formed nor even at a level that the organic waste material may be compressed tightly so as to form agglomerations which restrict the flow of respiratory gases (i.e. oxygen and carbon dioxide). If gas circulation is diminished by packing, anaerobic oxidation will occur, leading to a differently incompletely metabolized product, and will contribute to unwanted odors. Conversely, too little moisture (less than about 42%) inhibits microbial metabolism and reproduction.

The microbial growth also required the appropriate regulation of respiratory gases. Excessive levels of carbon dioxide retard microbial metabolism. Conversely, higher oxygen levels (i.e. about 7% to about 21%) make possible higher metabolic rates and higher rates of growth and reproduction. It is, of course, preferred that the organic waste material be maintained in a condition conducive to gas penetration and exchange. It is preferred that the organic material be shredded as finely as possible (while at the same time minimizing the chances of excessive compaction) prior to or during a processing to increase the surface area exposed. Most preferably, the organic waste material should be shredded by ripping rather than cutting or shearing. Particle size should be of sufficient magnitude to retain moisture.

For uniform composting, a relatively larger volume of organic waste material retains more heat (as the greater mass has a greater insulation wall to mass ratio), and generally more consistent microbial activity to break down the organic waste material. However, as the volume of the organic waste material is increased, the weight of the material can cause packing which restricts the circulation of respiratory gases. Therefore, there is a limited volume of mass for a given cross section of reactor vessel. If the critical mass is exceeded, bulking agents are required to create a skeletal structure for aeration facilitation, and volumetric efficiency diminishes. Also, for uniform composting, other factors must be considered such as agitation which: (1) remixes hot and cold spots for uniform fermentation; (2) remixes wet spots to conserve moisture and reduce anaerobic metabolization; and (3) unlocks hidden pockets of nutrition, to name a few.

It is also important to maintain the carbon/nitrogen ratio within a range preferred for microbial growth, i.e. from about 15:1 to about 40:1 and most preferably from about 15:1 to about 20:1.

Many of the prior art methods and related apparatus have failed to provide the foregoing preferred conditions throughout the mass of the organic waste material to be processed. Also, the prior art methods and apparatus have not allowed for the substantially real time monitoring of the environment of the microbial growth substantially through the volume of the mass of organic waste material.

The monitoring of the environment of the microbial growth is important because it allows one to be apprised of changes in the important environmental parameters such as those discussed above, and to allow one to control the environment in response to the information gathered by this monitoring. Such control and/or alteration in the microbial growth environment may take the form of agitation of the organic waste material (to provide additional gas circulation to the interior of the mass of the organic waste material being processed and/or to aid in equilibrating the temperature between the inside portions and the outer portions of the mass of the organic material being processed). Other forms of control may include the addition of water or increasing the circulation of respiratory gases such as by venting or injection of other gases to or from the reaction vessel to aid in the removal of carbon dioxide and addition of oxygen, or adjusting the carbon/nitrogen ratio of the organic waste material by the addition of chemicals or by the addition of aliquots of organic waste material selected to balance the carbon/nitrogen ratio.

The method of the present invention in its most fundamental form comprises the steps of (1) placing organic waste material in at least one reactor vessel; and (2) containing microbial growth in the organic waste material while also maintaining substantially real time monitoring of the environment of the microbial growth substantially across the mass of the organic waste material (i.e. the volume of the at least one reactor vessel) for sufficient time to allow the organic waste material to be converted to substantially stable humus.

The reactor vessel used in accordance with the present invention should be adapted to contain the organic waste material and should be adapted to aerate and/or agitate its contents and to allow the intake and output of the organic waste material. Also, the reactor vessel should be adapted to allow for the placement of monitoring probes within its volume and to allow for the conduction of gases or electronic signals from the monitoring probes as will be more fully appreciated from the example presented below.

It is a preferred embodiment of the inventive method that the organic waste material be shredded. This may be carried out with any shredding mechanism adapted to shred the material to approximately a consistency of loose soil and in the desired volume to be processed. Such shredding mechanisms are commonly known and used in the art such as those used in the shredding of trees and branches. Using a mixer/grinder or shredder, the organic waste material is finely shredded to give a uniform mixture with the preferred particle size being about 1/64th inch square or finer, but not so fine so as to create a "mud-like" consistency.

It is also preferred that the organic waste material to be processed have a carbon to nitrogen ratio in the ranges of from about 15:1 to about 40:1, and most preferably from about 15:1 to about 30:1. Some samples of organic waste material may already fall within these ranges. However, in other cases it may be necessary to adjust the carbon/nitrogen ratio to within the preferred values by the addition of complimentary aliquots of high or low carbon/nitrogen ratio organic waste material mass to be within the prescribed carbon/nitrogen ratio ranges. This may be preferably done by first measuring the carbon/nitrogen ratio of several types of organic waste material to be processed (if available). Complimentary amounts from two or more sources can then be admixed during the shredding process to give an organic waste material mixture within the aforesaid ranges. For example, the majority of animal wastes, such as manure, hair, feathers and urine are rich in nitrogen, as are fish, green plants, coffee grounds and ground meals such as soybeans. Household garbage is also a good source of nitrogen and trace minerals. A rapid and hot composting cycle producing a rich, black humus can be best achieved by providing a well balanced mixture of carbon and nitrogen in the organic waste material.

It is also preferred that the water content of the organic waste material be in the range of from about 40% to about 60% by weight, and preferably in the range of from about 50% to about 55% by weight. The water content of the organic waste material may be adjusted either prior to or during the processing by the addition of liquid water or liquids containing organic nutrients (such as whey, blood and/or their liquid components). The addition of liquid may be carried out by spraying to increase the moisture content. The addition of dry material, such as sawdust or paper dust, may be used to decrease the overall per volume moisture content.

The substantially real time monitoring of the microbial growth environment can be done by providing a plurality of sensors distributed substantially across the volume of the reactor vessel(s). These sensors may monitor such parameters as oxygen, carbon dioxide, humidity, pH, and temperature. For instance, temperature monitoring may be done by temperature-sensitive semiconductor sensors. Other sensors may include small gas inlets which conduct gas samples out of the reactor vessel(s) to instruments adapted to measure such parameters as oxygen, carbon dioxide and moisture. An example of such an apparatus is described below.

An important preferred embodiment of the present invention involves the gathering and processing of information from the sensors. This may be done by microprocessor means which can be programmed to gather and collate the environmental parameter information so as to monitor these parameters and collate the information such as (1) monitoring the environmental parameters over time or (2) monitoring the environmental parameters vis-a-vis the type(s) or source(s) of the organic waste material being processed. By doing this, information regarding the optimum processing environment for each type or source of organic waste material, or mixtures thereof, can be used in a waste processing facility using the method of the present invention. This is particularly important for the long-term processing of organic waste material in such a processing facility which may continue to receive organic waste of several types from a variety of sources. By using microprocessor means to develop a "reaction profile" for each of such types or sources of organic waste material, the processing of organic waste material into a humus product can be made more efficient over the long-term. Such a "reaction profile" can also be assembled by artificial intelligence means in accordance with known artificial intelligence techniques, programming and apparatus known in the computer and data processing field.

A typical information processing scheme is described below.

An example of a microprocessor logic flow may be as follows:

COMPOSTING CONTROLLER SOFTWARE FLOW 5-90

(HIGH LEVEL)

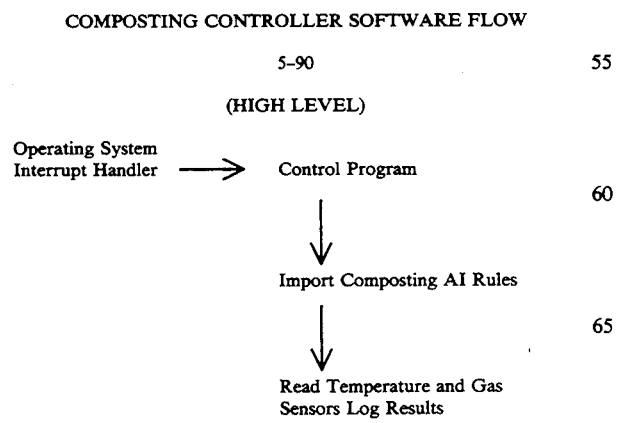

COMPOSTING CONTROLLER SOFTWARE FLOW 5-90 B.C.M.

(MID LEVEL)

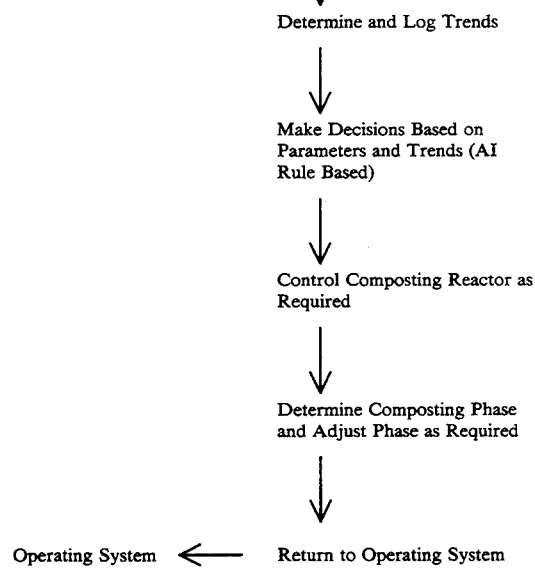

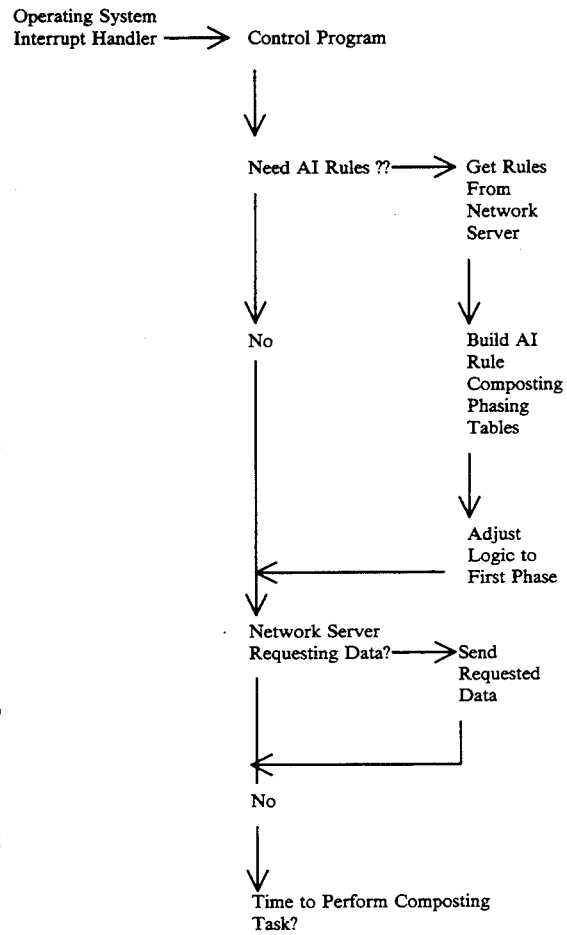

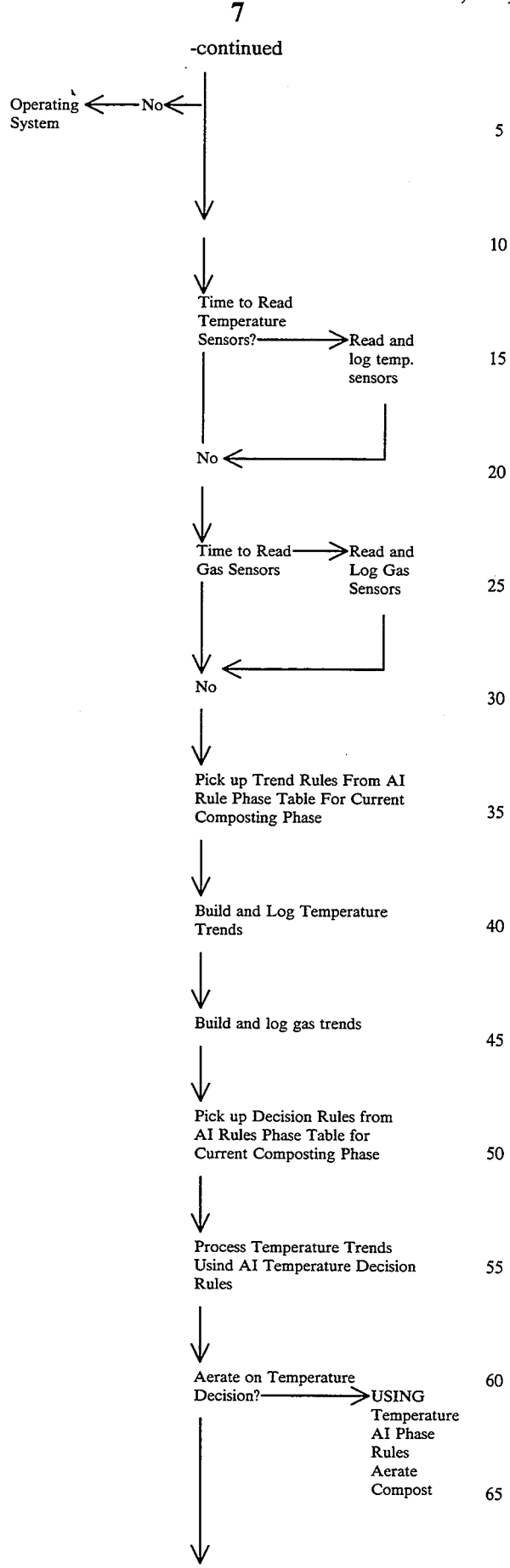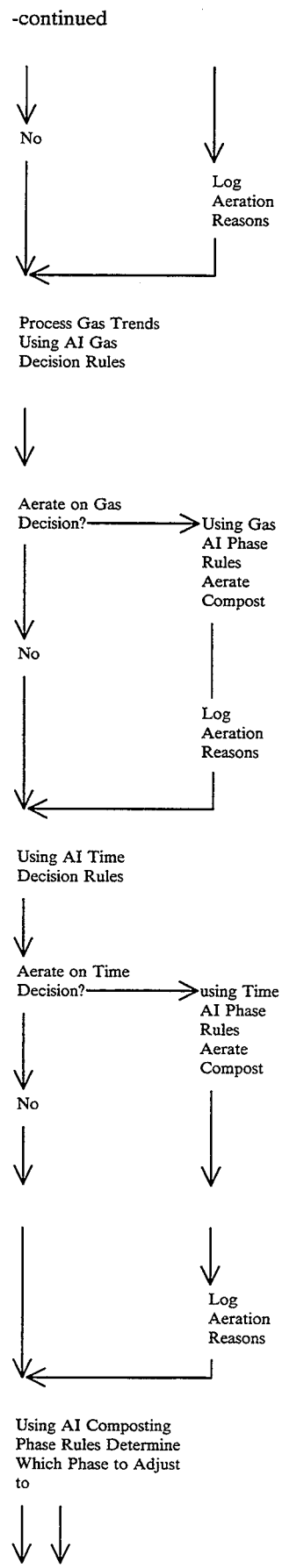

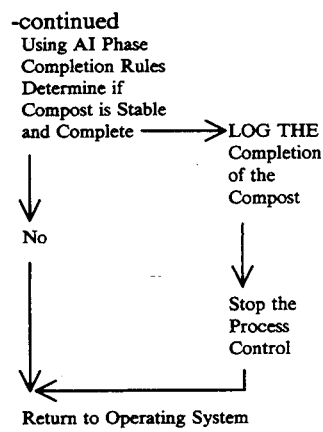

```
-continued
Using AI Phase
Completion Rules
Determine if
Compost is Stable
and Complete ─────▶ LOG THE
        │              Completion
        │              of the
        ▼              Compost
       No              │
        │              ▼
        │             Stop the
        │             Process
        │             Control
        ▼◀────────────┘
Return to Operating System
```

Some of the other objectives served by the microprocessor means may be (1) to monitor the activity and work flow of all of the active reactor vessels, (2) to assure the integrity and the quality of all the composting functions, (3) to detect and report improperly prepared organic waste material mixtures which may have been accidentally or intentionally loaded into the reactor vessel(s), (4) to detect and report the accidental or intentional premature aborting of the composting process, (5) to detect (e.g. electronically), by computer or by networking, problems anywhere throughout the network, (6) to provide system-wide network problem detection, problem diagnostics and problem resolution, and (7) control material handling equipment for transport of the organic waste material to the reactor vessel and/or the humus product from the reactor vessel.

It is preferred that each reactor vessel be equipped with a process control computer whose primary functions are to perform periodic sensing to ascertain the environmental status of the organic waste material being processed and to report the sensing results to a central computer monitor. In addition, the process control computer interprets the results of the periodic sensing in the light of rules provided by the central computer monitor, and reacts thereto, m all as will be further explained hereinafter. In the preferred embodiment, a central computer monitor will be networked to a process control unit on each of the reactor vessels. The central computer monitor primarily functions as a data analyzer and as a central data base. It may graphically display the status of environmental parameters associated with the composting process for each active reactor. It may also accept and store data from designated individual system operators to show the composition of the organic waste material loaded into each reactor vessel. It may also accept instruction from the system operator to start monitoring a given reactor vessel and may periodically request the process control unit to provide it with environmental parameter data. This data may be stored in a data file designated specifically to each reactor vessel. The data may then be evaluated to (1) determine when and if the organic waste material in the reactor needs to be repositioned (such as by agitation, aeration or stirring); (2) when the organic waste material is stabilized, that is, when the microbial metabolic rate has become substantially nutrient-limited, (3) direct the process control unit on a given reactor vessel to stop monitoring when the composting process has stabilized, and (4) alert the system operator that the composting process is completed.

The central computer monitor in each plant site comprising a plurality of reactor vessels may be linked to a master computer monitor located at a central site. The master computer monitor may then integrate information from each plant over time so that data from completed processing runs may be further evaluated, inappropriate composting procedures monitored, and providing a permanent archive of all processing data from the individual plant sites.

It is also within the scope of the invention to carry out the method of the present invention with the aid of a chemical/mineral catalyst such as that disclosed in German Patent Application P 37 44 317.8-41 by Rudolph Küirner, filed Dec. 28, 1987 and entitled APPLICATION OF CALCIUM SULFATE FOR THE IMPROVEMENT OF FERMENTATION OF ORGANIC WASTE MATERIALS, which is hereby incorporated herein by reference. A translation of the published German application P 37-44 317.8-41 is as follows:

Dr. rer. nat. Rudolf Küirner

APPLICATION OF CALCIUM SULFATE FOR THE IMPROVEMENT OF FERMENTATION OF ORGANIC WASTE MATERIALS

Priority

German Patent Application P 37 44 317.8-41 of Dec. 28, 1987

Patent claims

1. Application of calcium sulfate together with Montmorillonite and at least one phosphate for the improvement of fermentation of organic waste material and/or for fertilizing.

2. Application of calcium sulfate arising from flue gas desulfurization according to claim 1.

3. Application of calcium sulfate in a weight ratio to Montmorillonite of 1:0.1 to 10, respectively 1:0.25 to 5, especially 1:0.5 to 1.5 and in quantative proportion to phosphate of 1:0.1 to 10, respectively 1:0.25 to 5, especially 1:0.5 to 2 according to claim 1 or 2.

4. Application of calcium sulfate together with at least one insoluble phosphate, respectively raw phosphate powder and/or Thomas phosphate powder according to one of claims 1-3.

5. Application of calcium sulfate according to one of claims 1-4 together with auxiliary further alkali earth compounds, respectively calcium-and/or magnesium compounds ore-minerals.

6. Application of calcium sulfate according to one of claims 1-5 in a mixture with Montmorillonite and phosphate.

7. Application of calcium sulfate in an amount of 100 grams to 50 kilograms respectively to 15 kilograms for each cubic meter of organic waste material to be fermented according to one of claims 1-6.

8. Application of calcium sulfate in an amount of 50 grams to 5 kilograms, respectively up to 1 kilogram for each square meter of level composting according to one of claims 1-6.

9. Material for the improvement of fermentation of organic waste material and/or of fertilizing with an amount of calcium sulfite, thereby characterized that it contains additionally Montmorillonite and at least one phosphate.

10. Material according to claim 9, thereby characterized that it contains as calcium sulfate, calcium sulfate derived from flue gas desulfurization.

11. Material according to claim 9 or 10 characterized thereby that it contains a weight ratio of calcium sulfate to Montmorillonite of 1:0.1 to 10, respectively 1:0.25 to 5, especially 1:0.5 to 1.5, and a weight ratio of calcium sulfate to phosphate of 1:0.1 to 10, respectively 1:0.25 to 5, especially 1:0.5 to 2.

12. Material according to one of claims 9–11, characterized thereby that it contains as phosphate, insoluble phosphate, respectively raw phosphate powder and/or Thomas phosphate powder.

13. Material according to one of claims 1–12, characterized thereby that it contains auxiliary further alkali earth compounds, respectively calcium and/or magnesium compounds ore-minerals.

14. Material according to one of claims 9–13, characterized thereby that it contains additional trace elements, respectively ore powder and/or grounds slag.

15. Material according to one of claims 9–14, characterized thereby that it contains additionally foam plastic flakes, respectively amino plastic foam flakes, and humus.

16. Material according to claim 15, thereby characterized that it contains, for each part volume humus, three to six, respectively four to five parts volume of plastic foam flakes and 0.025 to 0.25, respectively 0.05 to 0.15 parts volume of the mixture according to one of claims 1–14.

APPLICATION OF CALCIUM SULFATE FOR THE IMPROVEMENT OF FERMENTATION OF ORGANIC WASTE MATERIALS

Organic waste material especially of plant origin are broken down largely by the influence of aerobic microorganisms in humus formation. In humus formation, not only are bacteria and mushrooms involved, but rather also protozoa as well as lower and higher worms. The presence or absence of bases is of determinative importance for the quality of the humus and the speed of the microbial conversion. Should basic mineral materials be present in sufficient amounts, humus colloids saturated with base form, which together with the clay colloids constitute the so called absorption complex of the ground.

Basic mineral materials, which are normally deposited in humus formation, are calcium carbonate and dolomite, and also coral-as well as algae lime. Calcium carbonate and its double salt with magnesium carbonate are however only very slightly soluble, which lessens its effect. Otherwise, the alkalinity with certain microorganisms takes effect negatively, which also leads to a slow rotting in the humus formation.

Calcium oxide has already been used as an elutriate for solidification, in order to make it depositable, however calcium oxide would kill off nearly completely or substantially the microbial growth, such that calcium oxide is unsuited for accelerated humus formation.

In the near future, an incalculable amount of calcium sulfate, so called REA-gypsum, will accumulate especially through the increasingly performed desulfurization of flue gas from coal power plants; this is not only an historically worthless by-product, but rather because of deposition, causes increased costs.

From DE-OS 3 614 183, it is known to use calcium sulfate together with dolomite, soda, borax and citric acid as fertilizer or rapid compost for organic waste.

The object underlying the invention is thus to improve the fermentation of organic waste material and/or to achieve increased soil fertilization with the respectively large amounts of produced calcium sulfate.

According to the invention, this problem is solved by one applying calcium sulfate together with Montmorillonite and at least one phosphate for the improvement of the fermentation of organic waste material and/or soil fertilization.

If here one speaks of a fermentation of organic waste material, this concept is meant in its broadest sense and means the microbial decomposition of plant and animal material, such as composting and humification, the decomposition of organic domestic and industrial garbage, the level handling of agricultural and forestry soils and other decomposition processes for organic waste material with the action of microorganisms, such as bacteria and molds.

The application according to the invention of calcium sulfate from a preferred origin, such as from REA-gypsum, other gypsum or anhydride, in the provided mixture, leads to a series of surprising advantages, which the worker in the field could not anticipate.

The addition of calcium sulfate to organic waste material upon its fermentation, such as for decomposition for composting, is not only tolerated, but rather surprisingly the fermentation is activated by this addition and accelerates, which is possibly attributable to various causes. Calcium sulfate is more soluble than calcium carbonate, reacts neutrally and contains required calcium for actomycetes which plays an essential role at the on-set of decomposition, and required sulfur, even already in oxidized form, for the microorganisms. The foregoing invention is not limited to a particular theory, but rather may be experimentally proven, that the chemical conversion in composting proceeds quicker through the addition of calcium sulfate and that the composting is completed than in the present state of the art.

The quality of the humus in composting or level fertilizing through the mixture applied according to the invention. This manifests itself not only optically and sensorially in the humus product, but rather may be quantified in the form of an increase in yield, which is provable by comparison testing with differently produced humus. Thus it can be ascertained by way of testing that the plant yield in humus, which is prepared under addition of a mixture according to the invention was fundamentally higher than the yield of humus which was obtained through the addition of lava powder or algae lime under coapplication of calcium phosphate and bentonite or through addition of a mixture of Thomas powder and bentonite or through addition of a mixture of calcium sulfate, dolomite, soda, borax and citric acid.

It was further ascertained that the microbial fermentation of organic waste material under addition of a mixture applied according to the invention had a decontaminating effect where for example heavy metals, such as cadmium, are consumed by the microorganisms. In soils, which exhibit lower cadmium content, even a stronger increase in microbial activity is observed.

Finally, through the mixture applied according to the invention the odor nuisance of animal or human excrement, where a faster microbial decomposition of sewage proceeds, can be eliminated such that this can be used as fertilizer without odor nuisance.

As it is known that the microbial conversion of any given organic waste material of animal or plant origin proceeds aerobically in the same fashion, it is assumed that the application according to the invention of calcium sulfate in each fermentation of organic waste material leads to the advantages described above, irrespective of whether it relates to organic waste materials such as solid or liquid animal or human excrement, the mulching or level composting of straw, grasses or leaves, forest leaf and needle downfall or community waste in rotting or solid material fermentation.

In the fermentation of waste materials in mass, as in rotting for composting or in solid material fermentation, it is advantageous to add calcium sulfate in an amount of 100 grams to 50 kilograms, respectively to 15 kilograms, respectively from 5 to 10 kilograms for each cubic meter of organic waste material. In the case of level handling, as in mulching or in level composting, it is effective to spread the calcium sulfate in an amount of 50 grams to 5 kilograms, respectively to 1 kilogram, especially in an amount of 100 to 500 grams per square meter. The addition of Montmorillonite according to the invention is preferably bentonite, especially calcium bentonite. The Montmorillonite has an especially beneficial effect in that it attributes to the humic acid and thus the complexes so formed retain water in the soil.

As phosphate, soluble and insoluble phosphate may be used according to the invention. Soluble phosphates comprise the known superphosphate, calcium dihydrogen phosphate and calcium sulfate, and can be obtained by the conversion of raw phosphate with sulfuric acid. Preferably, however, insoluble phosphate is used according to the invention, such as especially raw phosphate powder and/or Thomas phosphate powders. The Thomas phosphates come from the lining of the Thomas converter and contain about 15% $P_2O_5$. Raw phosphates normally have a $P_2O_5$ content of about 30%. Further to the components set forth above, even Thomas lime or metallurgical lime can be applied with the calcium sulfate.

The three required components of the invention, calcium sulfate, Montmorillonite and phosphate can be separately added into the organic waste material to be fermented or on the soil to be improved. Preferably, however, one places them in a mixture with one another as a material for soil improvement or for the improvement of the fermenting of organic waste material.

Such material according to the invention may contain additional further alkali earth compounds, preferably calcium and/or magnesium compounds ore-minerals which contain such compounds. The material according to the invention also contains effective additional trace elements, preferably in the form of ore powder and/or slag powder.

An especially advantageous form of the soil improvement according to the invention comprises, additional to the mixture of calcium sulfate, Montmorillonite and phosphate, foam flakes, preferably amino plastic foam flakes as well as humus. In this regard, particular amino plastic foam flakes can be produced according to DE-PS 2 447 880, fully incorporated herein by reference. The foam flakes applied in accordance with the invention can have the characteristics especially set forth in this DE-PS 2 447 880. Suitably, the soil improvement material contains herein for each part volume of humus three to six, preferably four to five parts volume of foam flakes and 0.025 to 0.25, preferably 0.05 to 0.15 parts volume of a mixture of calcium sulfate, Montmorillonite and phosphate, including trace elements. Independent of whether the calcium sulfate, Montmorillonite and phosphate are applied separately or in a prior mixture with one another, it is advantageous that the amount ratios of these three components of the invention are so adjusted that the weight ratio of calcium sulfate to Montmorillonite is 1:0.1 to 10, preferably 1:0.25 to 5, and especially 1:0.5 to 1.5, and that the weight of calcium sulfate to phosphate is 1:0.1 to 10, preferably 1:0.25 to 5, especially 1:0.5 to 2. One achieves good results for instance with a weight ratio of calcium sulfate to Montmorillonite to phosphate of 1:1:1 or 1:1:0.5.

Comparative Experiment 1

Using the normal Cress test, humus produced according to the invention was compared with regard to yield to two humus types obtained according to the state of the art.

The humus according to the invention was obtained in a static tunnel reactor under addition of one kg calcium sulfate, 5 kg dolomite, 15 kg Thomas phosphate powder and 10 kg bentonite per 1.5 cubic meter of plant waste. This humus was designated as humus A.

A comparative humus B was produced in corresponding fashion under addition of 10 kg of bentonite and 15 kg Thomas phosphate powder, but without calcium sulfate. A further comparative humus was obtained in the same apparatus under addition of 10 kg bentonite, 10 kg lava powder and 10 kg raw phosphate per 1.5 cubic meters. Finally, a normal commercial worm humus on the basis of rinderpest was used as comparative humus D.

In the quantitative Cress test, level plates of cement 40×25×6 centimeters filled with the compost to be tested were seeded with 10 grams Cress seeds. On the second and fourth day the consumed water was replaced. On the sixth day, the Cress was cut with shears and weighed.

The comparative humus C gave a yield of 86 grams, the commercial worm humus D 124 grams, the humus B obtained only under application of Thomas phosphate powder and bentonite 137 grams, the humus A obtained under the calcium sulfate supplement according to the invention 160 grams.

It is therefore apparent that the calcium sulfate supplement yielded the humus improvement in the form of a yield increase.

Comparative Example 2

In order to show the surprising technical effect of the invention as compared to the content of DE OS 3 614 183, a comparative experiment with Cress seeds was carried out.

Formulation A was consisted of 1l humus, which was well mixed with 3.8 grams gypsum, 3.8 grams Thomas phosphate and 1.5 grams bentonite.

Formulation B consists of 1l humus, which was well mixed with 5 grams pulverized Dihydragypsum, 1.5 grams pulverized dolomite, 0.4 grams soda, 0.175 (g) borax and 0.05 grams citric acid.

From each of both formulations A and B, 4 grams were suspended in 50 milliliters of water and milligrams of Cress seeds allowed to soak therein for 90 minutes.

Both seed suspensions were divided in a plant grid with humus and placed on a rain-isolated plate in the open. Watering was carried out automatically in a germination container constantly supplied by a floor water stand.

DETAILED DESCRIPTION OF THE PREFERRED EMBODIMENTS

Figure 1:
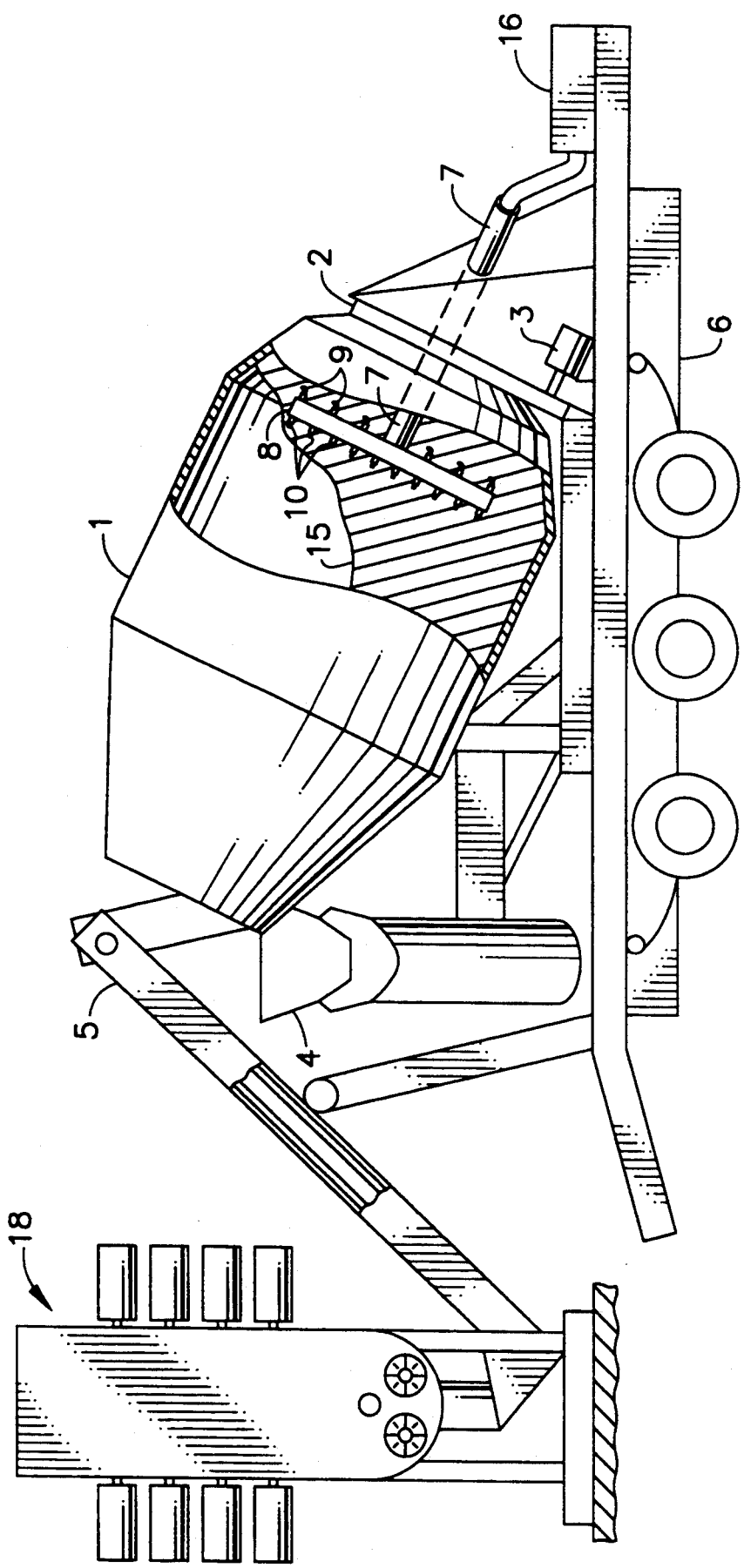
FIG. 1 is an elevational view of a reactor vessel, showing the position of the sensor wand, and a grinder apparatus used in accordance with one embodiment of the present invention.

A detailed description of the preferred embodiments described below also represent the best mode of the invention, including the inventive method and the apparatus therefor.

In the first step of the preferred embodiment of the inventive method, the organic waste material is first tested to determine whether it falls within the prescribed carbon/nitrogen ratio range described above, the preferred ratio range being from about 17:1 to 30:1. This may be determined by the use of advanced or commonly used laboratory equipment, or rough guidelines from the most recent Rodale Guide to Composting, published by Rodale Books, hereby incorporated herein by reference, used to establish approximate carbon/nitrogen ratio values. If the organic waste material falls outside the preferred carbon/nitrogen ratios, organic waste material from other sources or of other types may be used to adjust the carbon/nitrogen ratio accordingly.

A sample of the different types of organic waste materials available are dried and accurately weighed to establish their dry cubic meter weights for proper mixing of different blends of organic waste materials. The drying may be done by a microwave oven.

With the proper carbon/nitrogen ratio established, the organic waste material is shredded in a mixer/grinder to give a fine consistency and uniform mixture. At this point, the chemical/mineral catalyst mixture described above, if used, is mixed with the organic waste material. Use of the catalyst is particularly beneficial if a specific fertilizer requirement is to be achieved. The shredded organic waste material, with or without the chemical/mineral mixture has a consistency approximating that of loose soil. Homogenous samples may be removed and a carbon/nitrogen ratio test can be performed (such as with a Perkin-Elmer CH2400 Carbon/Nitrogen Analyzer) to determine the carbon/nitrogen ratio.

A small portion of the blended materials is drawn off and accurately weighed to record the wet weight. Again using the microwave oven, a sample of the organic waste material (and chemical/mineral catalyst, if used) are dried and the original moisture content is calculated. Liquid is added to bring the moisture level of the material to be processed up to a level of approximately 50% to 55%; or using fine sawdust or paper dust, the material is dried if the water content is above 55% to bring the moisture into the aforesaid preferred percent by weight range.

Once the organic waste material and chemical/mineral catalyst (if used) together are properly adjusted for the appropriate carbon/nitrogen ratio and moisture content, the materials are placed in the reactor vessel(s).

In order for aerobic microbes to flourish, they need, among other things, constant access to ample fresh air containing sufficient levels of oxygen (3 to 20%). There are four phases to the composting cycle: the lag phase; the peak demand phase; the declining phase; and the endogenous phase. During the lag phase, the microbes are involved in colonizing the mass they are going to convert. Very slow oxygen uptake is observed during this phase. During the peak demand phase, after the organic mass has been colonized, microbes are reproducing at a very high rate. It is during this phase that the most oxygen utilization is to be noted. Therefore, oxygen replenishment throughout the mass is of utmost importance to maintain aerobic conditions throughout.

It has been observed that during the peak demand phase, oxygen in the mass can be depleted in about 12-15 minutes. Thereafter, aerobic microbes begin to die off. Within 30 minutes, or so, of oxygen depletion an anaerobic microbes start to become active. As a result, composting takes place in the form of anaerobic digestion. Methane gases are produced and odors can become a nuisance.

There are times in bioremediation of some hazardous waste materials (utilizing in-vessel composting) that there will be a calculated switching from aerobic digestion for a few controlled hours of anaerobic digestion. Thereafter, a controlled return to aerobic digestion takes place. Rules regulating these steps are established at the time the recipe of the waste materials being treated is entered into the data base of the central computer monitor in the file for the respective reactor. The rules are down-loaded to the process control computer of that reactor. The process control computer monitors and adjusts the internal environment of the reactor to follow the recipe rules for the particular run in question. It is also sometimes necessary to maintain temperatures at specific levels during some types of processing. Again, a fresh air supply of adequate quantities (in conjunction with controlled agitation commands which produce reactor vessel rotation) under a rule set down-loaded from the central computer monitor, is injected into the reactor to keep the temperature at the desired level or levels. Apparatus to accomplish appropriate aeration to accomplish aerobic/anaerobic/temperature control will be described hereinafter.

Using a combination of temperature-sensitive semiconductors as temperature probes and gas outlets connected to gas analyzers, both under control by the process control computer, periodic temperature and oxygen level recordings are made to track the microbial metabolic activity and pattern. When temperatures and/or oxygen levels move outside the above-mentioned optimum ranges, the reactor may be rotated (or the material therein may be otherwise agitated or aerated) to increase the gas circulation to more interior portions of the processing mass so as to replenish depleted oxygen and purge carbon dioxide and/or to aid in equilibrating the temperature throughout the processing mass. Ambient air can be added by a manifold system to be described hereinafter. Agitation frequently opens up more pockets of nutrients, made available for further microbe activity. The environment in the reactor vessel may also be changed by the addition of water, such as by spraying, or by the addition or venting off of respiratory gases.

The approximate end of the composting process can be determined when optimum temperatures and/or optimum oxygen utilization for microbial growth or activity (i.e. respiration) can no longer be maintained by rotation or agitation of the processing mass when the moisture, temperature and oxygen parameters are at acceptable levels for microbial growth. This can also be determined by testing samples of the processing mass to determine if the microbial metabolism and growth has reached a nutrient-limited rate. At this point, the humus product so produced is said to be "stable". The color of the humus product generally ranges from dark brown to black and the material has a smell akin to soil found in wooded areas. This smell and color combination also generally indicates a stable humus product.

The present invention also comprises an apparatus which may be used to perform the method of the present invention.

FIG. 1 shows a simplified elevational view of a reactor vessel 1 and a hopper-type mixer/grinder 18. FIG. 1 shows reactor vessel 1 which is a conical/cylindrical vessel similar to the type generally used on cement-mixing trucks, although of a slightly larger volume: preferably approximately 20 cubic yards. The preferred volume range of the reactor vessel, which may be of any geometry, is in the range of from about 0.15 cubic yards to about 30 cubic yards. The preferred cross-section of the reactor vessel is in the range of from about 24 inches to about 120 inches. The reactor is fitted with a chain drive 2 driven by hydraulic motor 3 so that the reactor vessel may be rotated about its axis and the contents stirred or agitated. The reactor vessel may have the typical fin-like structures common to cement mixing equipment to grip and stir the contents and act to aid in the charging and discharging of the reactor vessel. Agitation may also be accomplished by any other mechanical means known in the art such as by blades, rods, paddles, etc. The reactor vessel may also be fitted with an intake funnel 4 and may be adapted to accept the input from a chain conveyor 5. The reactor vessel may be mounted on a wheeled chassis 6 to allow it to be moved from place to place or within a waste treatment plant facility. FIG. 1 also shows the position of conduit pipe 7 which extends into the reactor vessel along its axis and holds sensor wand 8 within the volume of the reactor vessel. This sensor wand 8 is shown in more detail in FIG. 4. The sensor wand has disposed along its length a plurality of gas inlets such as 9 which extend substantially across the volume of the reactor vessel 8. The sensor wand also has disposed along its length a number of temperature sensors 10 which sense the temperature at various points across the volume of reactor vessel 8. Both the sensors and the gas inlets may extend above and below the lay line 15 of the organic waste material being processed.

Small conduits of laboratory-type tubing carry the gas samples along the length of the sensor wand to the conduit tube 7 and out to a gas analyzer located in control unit 16. Likewise, electrical wires carrying the electrical signals from the temperature sensors disposed along the sensor wand 8 extend from the individual sensors through the sensor wand 8 and through the conduit tube 7 and into control unit 16 (See FIG. 1) where they are monitored. The signals from the gas analyzer and the temperature monitor are conducted to the process control computer, which may constitute a port of the control unit 16.

A reactor vessel of the type shown is commercially available from McNeiles Corporation of Dodge Center, Minn. An example of the mixer/grinder is the 27% series commercially available from Kelly Duplex of Springfield, Ohio. An example of the temperature-sensitive semiconductors used in accordance with the present invention include model LM34 commercially available from National Semiconductor Company of Santa Clara, Calif. Examples of the gas analyzer(s) used in accordance with the present invention include Model APBA-251E commercially available from Horiba Company of Kyoto, Japan (oxygen analyzer) and Model APBA-250 commercially available from Horiba Company of Kyoto, Japan (carbon dioxide analyzer). The process control unit was assembled using the following components intelligent MPC based, back-up power control, drum motion controller, auto/manual control, analog/digital process monitoring and control, low-level diagnostics, imbedded EEPROM reprogram, instrument calibration and slave communications.

Figure 2:
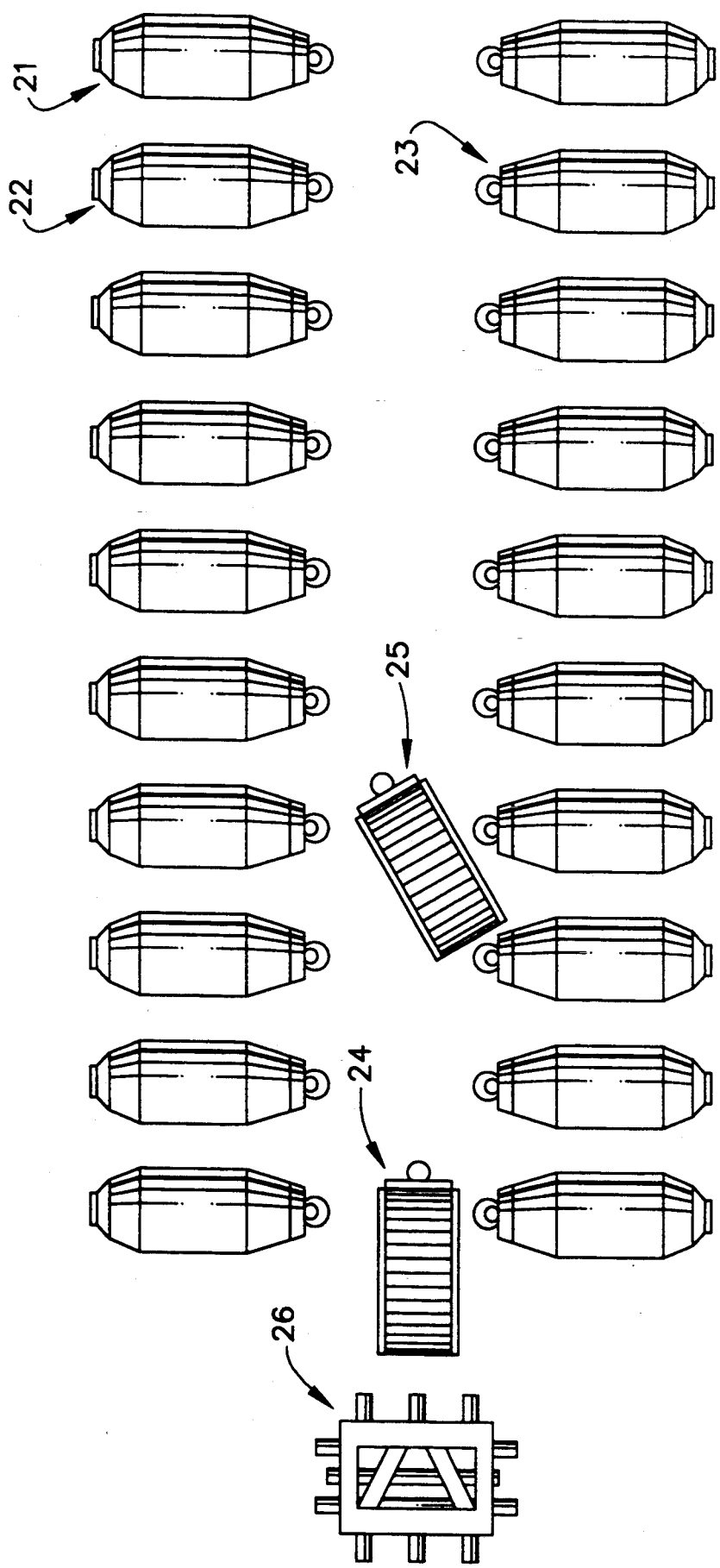
FIG. 2 is an overhead schematic of a organic waste material processing plant incorporating several reactor vessels in accordance with one embodiment of the invention.

FIG. 2 shows a typical waste treatment plant setup using a plurality of reactor vessels, such as 21, 22 and 23 which are served by conveyors 24 and 25 and mixer/grinder 26. The approximate throughput for a 20 reactor vessel system as shown in FIG. 2 is about 40 tons per day with a retention time of about three days.

Figure 3:
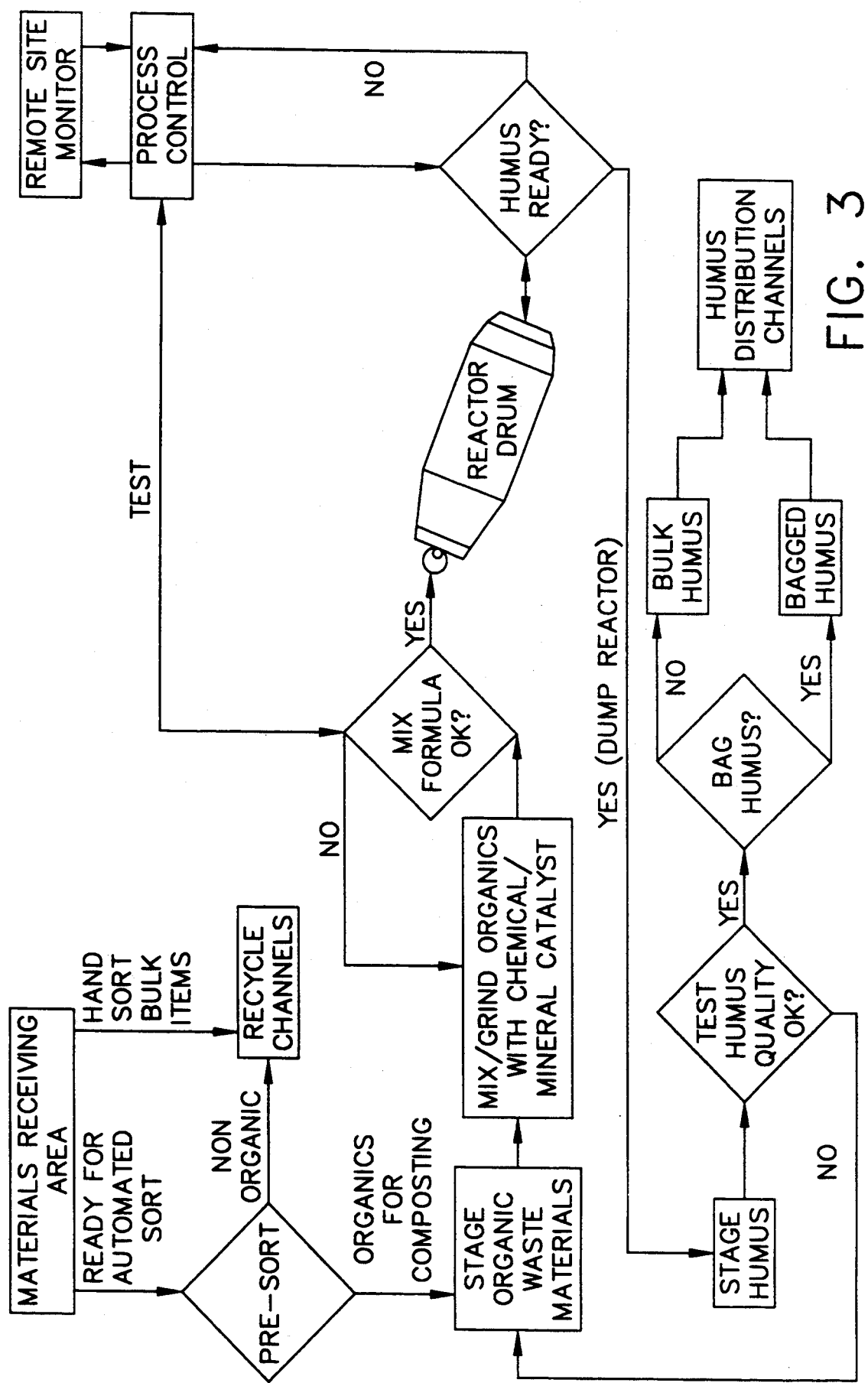
FIG. 3 is a schematic flow diagram of one embodiment of the process of the invention.

FIG. 3 shows a flow diagram for processing waste material and includes the process for composting organic waste material in accordance with the present invention.

Figure 4:
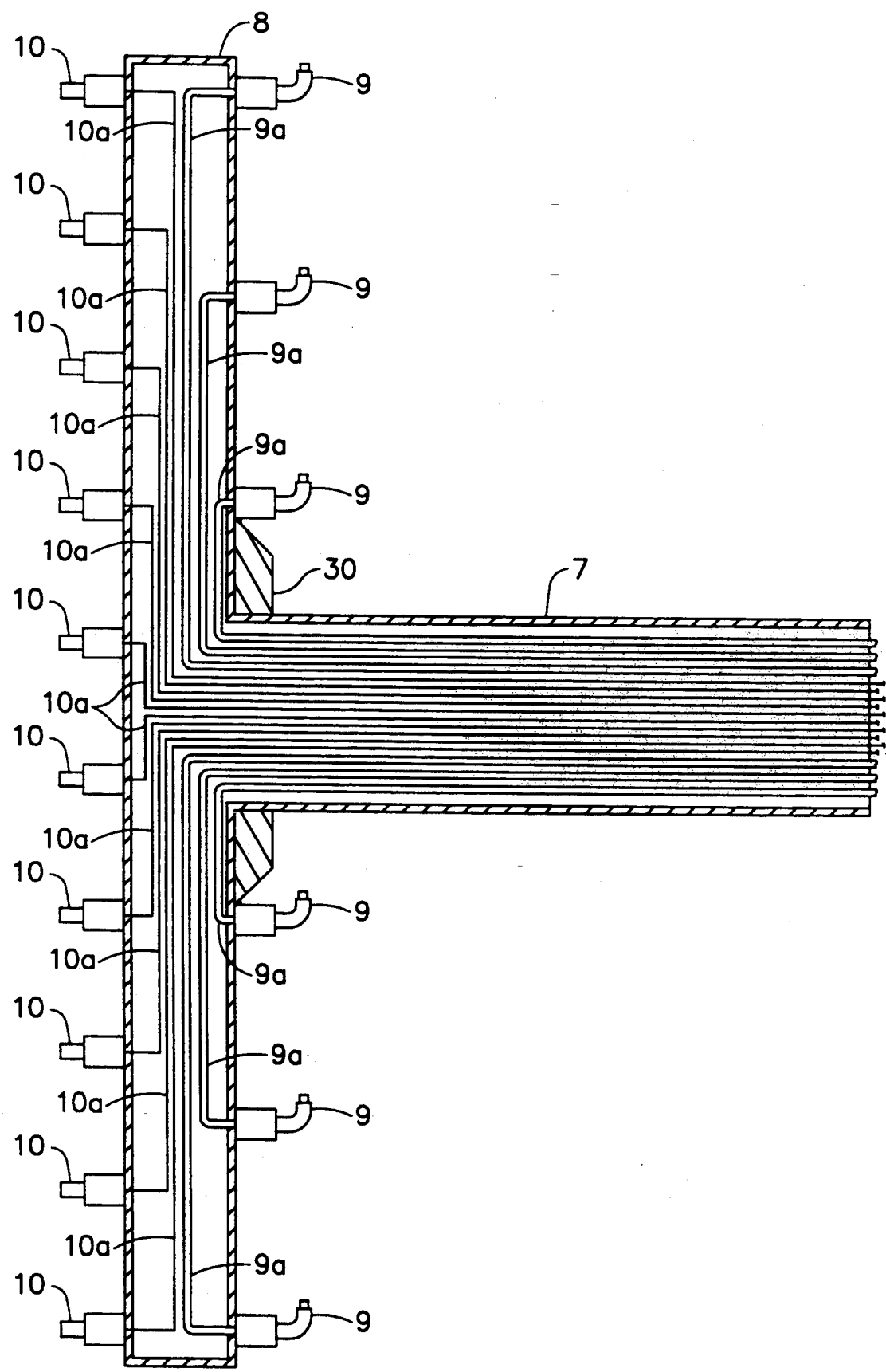
FIG. 4 is a detailed drawing of the sensor wand used in accordance with one embodiment of the invention.

FIG. 4 shows a detailed cross-section of the sensor wand 8 used in accordance with the present invention. Sensor wand 8 is supported by conduit tube 7 and saddle attachment 30. Along the length of the sensor wand 8, along one side, are disposed a plurality of temperature-sensitive semiconductors 10. Each of these temperature sensors is connected to the temperature monitor of the control unit 16 via respective leads 10a. Along the other side of the sensor wand 8 are disposed a plurality of gas-sampling inlets such as 9. Each of these gas-sampling inlets is connected via tubing 9a via conduit tube 7, to a gas analyzer of the control unit 16. The temperature sensors and gas samplers are disposed along the length of the wand so as to extend substantially across the volume of the reactor vessel as shown in FIG. 1.

Figure 5:
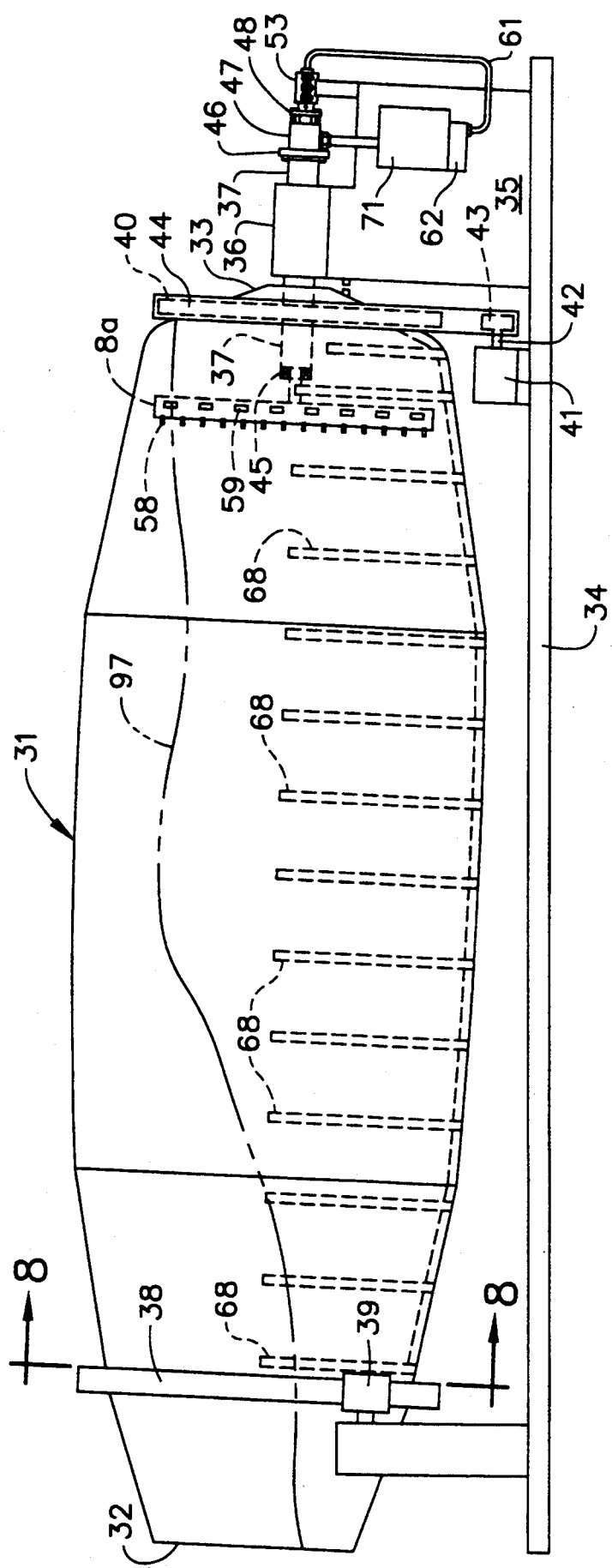
FIG. 5 is a simplified semi-diagrammatic elevational representation of a fixed installation of a reactor vessel of the present invention.

Reference is now made to FIG. 5 illustrating an exemplary stationary installation of a reactor vessel. The reactor vessel is generally indicated at 31. The reactor vessel has a forward or load/unload end 32 and a rearward end 33. A suitable supporting surface is provided for the reactor vessel 31, as at 34. Adjacent the rearward end 33 of the reactor vessel 31 there is a supporting pedestal 35 upon which a heavy duty pillow block bearing 36 is mounted. The bearing 36, in turn, carries the weight and thrust forces of the reactor vessel 31, supporting the rear axle 37 thereof. Near its forward end 32, the reactor vessel 31 has a surrounding support ring 38 mounted thereon. Support ring 38 is mounted on and cradled between a pair of support rollers, one of which is indicated at 39.

Rotation of the reactor vessel 31 can be accomplished in any appropriate manner including a cog drive, a friction wheel drive, a hub motor, or the like. Excellent results have been achieved by providing the reactor vessel with an exteriorly mounted sprocket gear 40, adjacent its rearward end 33. A prime mover 41 is provided, having a drive shaft 42 supporting a sprocket gear 43. The sprocket gears 40 and 43 are connected by a drive chain 44. The prime mover 41 may be of any appropriate type including an electric motor, an internal combustion engine, or the like. Excellent results have been achieved utilizing a hydraulic motor.

Figure 6:
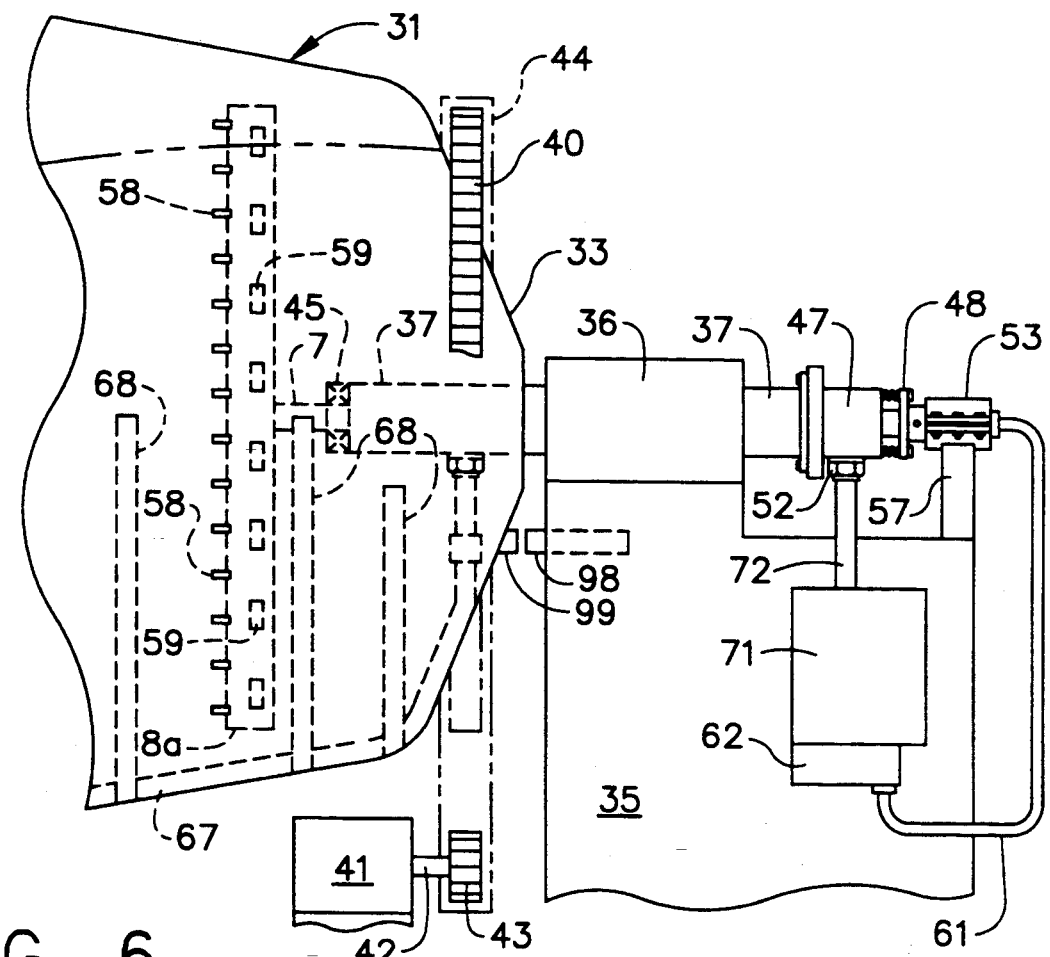
FIG. 6 is a fragmentary elevational view of the rearward end of the reactor vessel and its appurtenances.

Reference is now made to FIG. 6, which is an enlarged, fragmentary, simplified illustration of the rearward end 33 of reactor vessel 31 together with the reactor vessel axle 37 and the support means for the axle, comprising pedestal 35 and pillow block bearing 36. Pillow block bearing 36, as indicated above, not only serves as the rearward support for reactor vessel 31, but also counteracts any axial thrust of the reactor vessel. The axle 37 is a tubular member through which the sensor wand conduit tube 7 extends. In FIGS. 1 and 2 a sensor wand 8a is shown within the reactor vessel and affixed to the sensor wand conduit tube 7. The sensor wand 8a is substantially similar to the sensor wand 8 of FIG. 4 and will be further described hereinafter The location of sensor wand 8a within reactor vessel 31 and the size of the sensor wand should be such that its readings of temperature and oxygen content are representative of the mass. Multiple wands may be necessary, depending on the size of the reactor vessel.

At its forwardmost end located within reactor vessel 31, the reactor vessel axle 37 has a bearing housing 45 through which the sensor wand conduit tube 7 extends. As will be apparent hereinafter, the axle 37 rotates with reactor vessel 31, while the sensor wand 8a and sensor wand conduit tube 7 remain stationary.

Figure 7:
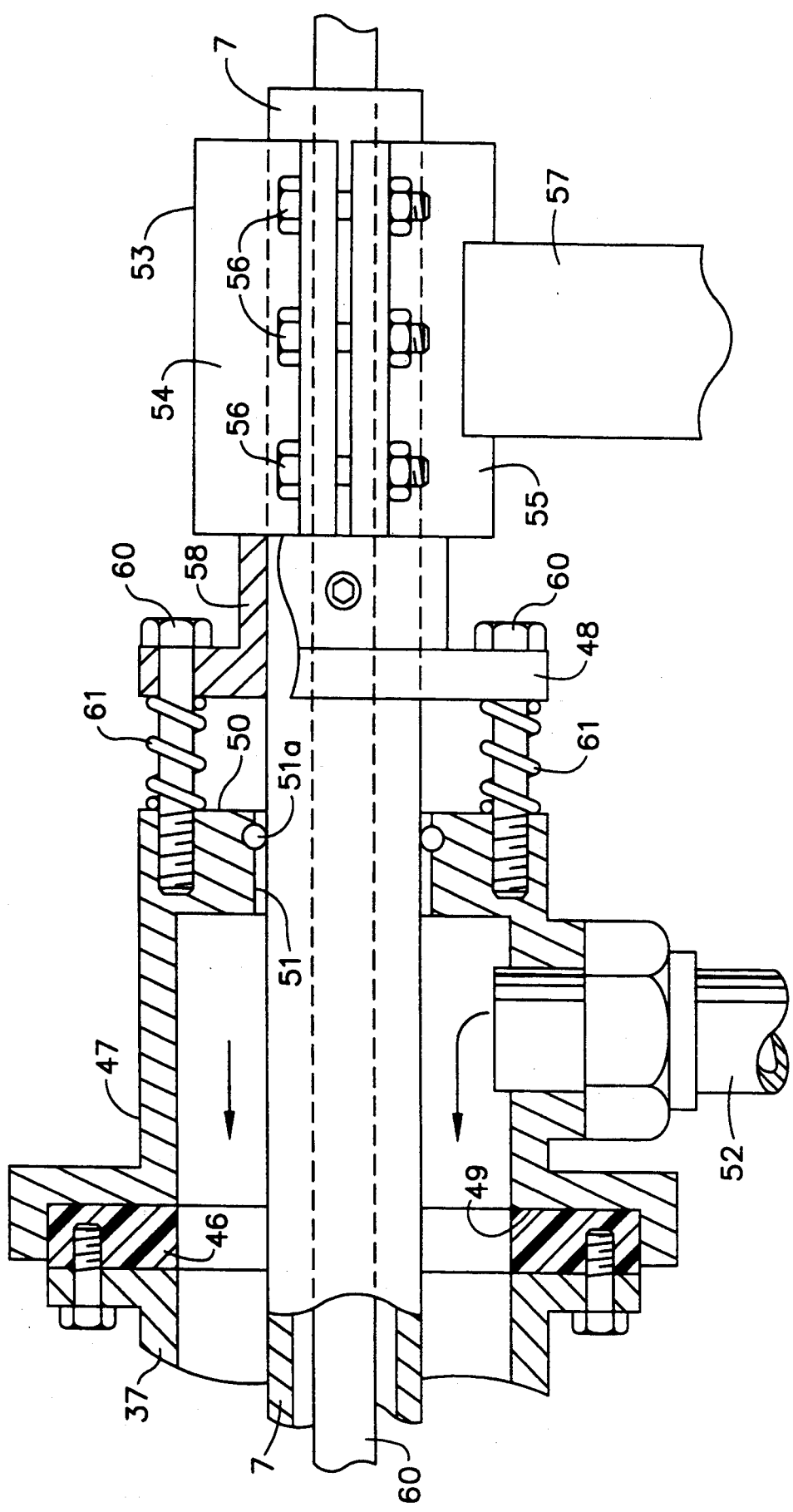
FIG. 7 is a fragmentary elevational view, partly in cross section, illustrating the reactor vessel axle, the air injector, the pressure plate, the sensor wand conduit tube, and the clamp therefor.

At its rearward end, the reactor vessel axle 37 has an appropriate fluid-tight seal 46 affixed thereto. Excellent results have been achieved using an annular phenol resin seal. The seal 46 is followed by an air injector 47 and a pressure plate 48, both of which are best seen in FIG. 7.

The air injector 47 comprises a hollow cylindrical member having an open end 49 and a closed end 50 with a central perforation 51 formed therein. Air injector 47 has a laterally extending inlet 52, the purpose of which will be apparent hereinafter. The open end 49 of air injector 47 is abutted against and sealed by phenol resin seal 46. It will be understood that the phenol resin seal 46 rotates with the reactor vessel shaft 37. The air injector 47, on the other hand, is fixed and, like the sensor wand conduit tube 7, does not rotate. The sensor wand conduit tube 7 extends through the perforation 51 in the closed end 50 of the air injector 47, with an O-ring 51a making a fluid tight seal between the sensor wand conduit tube 7 and the air injector 47.

To prevent rotation of the sensor wand conduit tube 7, the rearwardmost end of the tube 7 is engaged by a clamp 53 having upper and lower flanged clamping jaws 54 and 55, which surround and engage the sensor wand conduit tube 7. The flanges of the clamping jaws 54 and 55 are bolted together as at 56. It will be noted from FIGS. 5, 6 and 7 that the lower jaw 55 of clamp 53 is welded or otherwise affixed to an upstanding support or brace 57. The brace 57, in turn, is affixed to the supporting pedestal 35, or is otherwise anchored in place. Between the air injector 47 and the clamp 53, a pressure plate 48 is fixedly mounted on the sensor wand conduit tube 7. Pressure plate 48 comprises a sleeve portion 58 and an annular flange portion 59. The flange portion 59 has three transverse bores formed therein, through which three headed bolts extend with clearance. The bores and the headed bolts are evenly spaced about the flange portion 59 of pressure plate 48 and two of the headed bolts are shown at 60. All three of the headed bolts are threadedly engaged into the closed end 50 of air injector 47. Each of the bolts carries a compression spring, two of which are shown at 61. Each of the compression springs 61 abuts the closed end 51 of air injector 47 and the flange portion 59 of pressure plate 48. As a result of this, the springs 61 constantly urge the air injector against the phenol resin seal 46 maintaining an air-tight seal therebetween. The three bolts 60 also prevent rotation of the air injector 47.

It will be remembered that, as described with respect to FIG. 4, the sensor wand 8 carries a plurality of temperature sensors 10, each connected by leads 10a to the temperature monitor in the control unit 16. Each of the gas inlets 9 are connected by tubing 9a to the gas analyzer of control unit 16. It will be understood that the sensor wand 8a of FIGS. 5 and 6 is provided with temperature sensors 58 similar to the temperature sensors 10 of FIG. 4. The sensor wand 8a also has a plurality of gas inlets 59 similar to gas inlets 9 of FIG. 4. In this instance, however, the gas inlets 59 are located on the right side of the rigid sensor wand 8a (as viewed from the left in FIGS. 5 and 6). Since the reactor vessel 31 normally rotates in a clockwise direction (as viewed from the left in FIGS. 5 and 6) except when being unloaded, it has been found that the gas inlets, when so located, have less tendency to become clogged with the material being treated. It will be understood that the leads from the temperature sensors 58 and the tubes from gas inlets 59 extend through the sensor wand conduit tube 7 in the same manner shown in FIG. 4. At the rearward end of the sensor wand conduit tube 7, the tubes and leads are provided with a flexible sheath 61 and extend into a control unit 62, similar to control unit 16 of FIG. 1. Control unit 62 is diagrammatically shown in FIG. 9, and (as described with respect to control unit 16 of FIG. 1) the control unit 62 comprises a gas analyzer 63, a temperature monitor 64 and a process control computer 65. The three elements 63, 64 and 65 are shown and described as making up a single unit 62. It will be understood by those skilled in the art that the elements 63, 64 and 65 could be individually housed.

In order to provide air to the material being processed within the reactor vessel, a conduit 66 is located within the reactor vessel 31. The conduit 66 is connected at one end to the hollow reactor vessel axle 37, and at the other end to a manifold 67 which is affixed to the inside surface of the reactor vessel and extends longitudinally for the majority of the length thereof. In FIG. 5, the manifold 67 is shown as terminating at a position nearly corresponding to that of support ring 38. Evenly spaced along the length of the manifold 67 there are pairs of arcuate, oppositely directed aeration pipes affixed to the inside surface of the reactor vessel 31 and connected to the manifold 67. Pairs of such pipes are shown at 68 in FIG. 5. It will be understood that the conduit 66, the manifold 67 and the pair of arcuate pipes 68 are affixed to and rotate with the reactor vessel 31. The forwardmost pair of arcuate pipes are shown in broken lines in FIG. 8 at 68a and 68b and are exemplary of the other pairs. Each of the pipes 68a and 68b is capped at its free end and is provided with evenly spaced perforations by which air passing through the manifold 67 and pipes 68 can enter the reactor vessel 31. So that the amount of air is substantially even throughout the length of each of pipes 68a and 68b, the perforations nearest the manifold have a diameter of about 1/16 inch, while the perforations near the free ends of pipes 68a and 68b have a diameter of about ⅛ inch. Another way to insure more even supply of air within the reactor vessel 31 would be to provide the pipes 68a and 68b with perforations all having the same diameter, but being more closely spaced toward the free ends of the pipes. It will be understood that the other pipe pairs 68 will be substantially identical to the one described with respect to FIG. 8.

Returning to FIG. 6, the reactor vessel 31 is provided with a regenerative, pressure-building, variable speed electric blower 71. The electric blower 71 can deliver air at a pressure of from about 5 to about 40 inches of water to the air injector 47. The blower 71 is connected to the air injector inlet 52 by a conduit 72. Air from the blower 71 passes into the air injector 47, through the axle 37, conduit 66 and manifold 67 to the plurality of arcuate pipe pairs 68.

Figure 9:
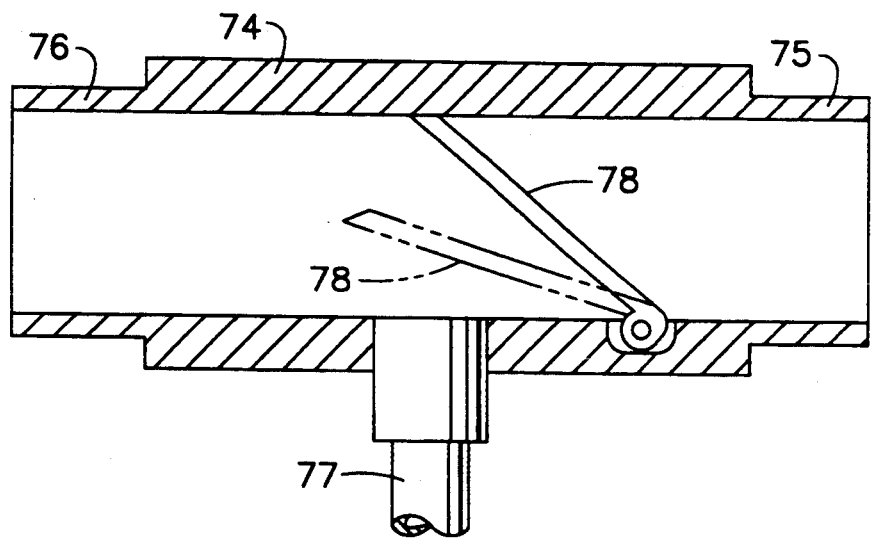
FIG. 9 is a fragmentary cross sectional view of the flapper valve of the present invention.

As will be developed hereinafter, it is sometimes desirable to send blasts of high pressure air (about 150 psi) through the manifold 67 and the arcuate pipes 68 to free those pipe perforations which might clogged by the material being processed. To this end, the cabinet of the blower 71 contains a flapper valve which is illustrated in simplified manner in FIG. 9. The valve 73 comprises a hollow body 74 having an inlet 76 for the receipt of pressurized air from the blower 71. The body 74 has an outlet 76 which is operatively connected to conduit 72. The body has a second inlet 77 connected to a source of high pressure air (not shown). The high pressure air inlet 77 is closable by a hinged flapper valve 78. As will be understood by one skilled in the art, the flapper valve 78 will normally close the inlet 77 by gravity. The flapper valve 78 will be closed whenever no air is required, or when air from blower 71 enters inlet 75. When high pressure air is introduced through inlet 77, the flapper valve will assume its open position as shown in FIG. 9. It will be noted that in its open position, the flapper valve closes inlet 75, protecting the blower 71 and its appurtenances from the high pressure air blasts.

Figure 10:
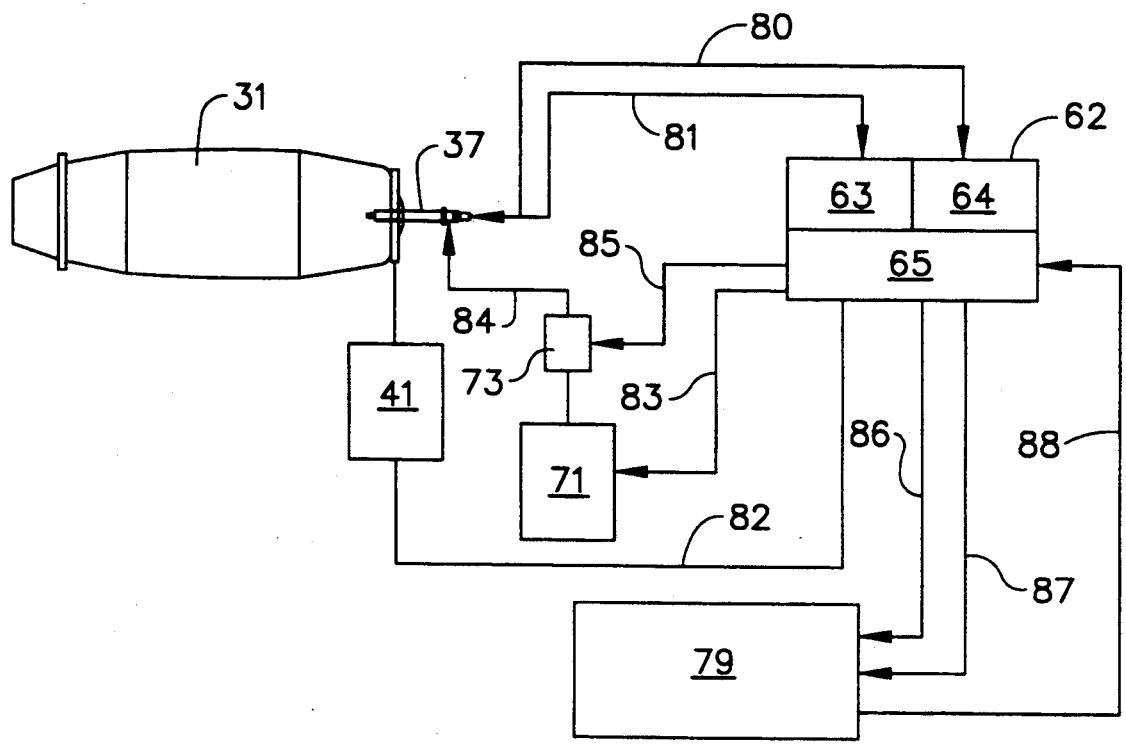
FIG. 10 is a diagrammatic layout of the apparatus of the present invention.

The apparatus thus far described is diagrammatically illustrated in FIG. 10. The reactor vessel is shown at 31 together with its sensor wand 8a. The control unit 62 is illustrated as being made up of gas analyzer 63, temperature monitor 64 and process control computer 65. The variable speed blower is shown at 71 with flapper valve 73, and the central computer monitor is shown at 79. It will be remembered that, when called for, temperature information from temperature sensors 58 of sensor wand 8a is transmitted to the temperature monitor 64 of control unit 62 by leads, represented in FIG. 9 by arrow 80. Similarly, gas samples, when called for, are collected by gas inlets 59 of sensor wand 8a and are transmitted via individual tubes to the gas analyzer 63. The individual tubes are represented in FIG. 9 by arrow 81. The prime mover 41, for rotating reactor vessel 31, is turned on and off by signal from the process control computer, as indicated by arrow 82. The variable speed blower 71 is turned on and off by signal from process control computer 65, as indicated by arrow 83. Output of the variable speed blower 71 is introduced into the hollow reactor vessel axle, the manifold, and the arcuate air pipes, as indicated by arrow 84. High pressure air may be introduced into the system represented by arrow 84 via valve 73 (see FIG. 10), upon a signal from process control computer represented by arrow 85. As will be understood, the signal opens a valve (not shown) connected to the source of high pressure air (not shown). Finally, it will be noted that gas sample information and temperature information are fed to the central computer monitor 79, as indicated by arrows 86 and 87. Rules for treatment of the material or recipe being processed are down-loaded to the process control computer from the central computer monitor, as indicated by arrow 88.

Where a number of reactor vessels are provided, each will have its own control unit 62, blower 71 and prime mover 41. Each control unit 62 will have its outputs 86 and 87 to the single central computer monitor 79 and the single central computer monitor will have an output 88 for each control unit 62.

Figure 11:
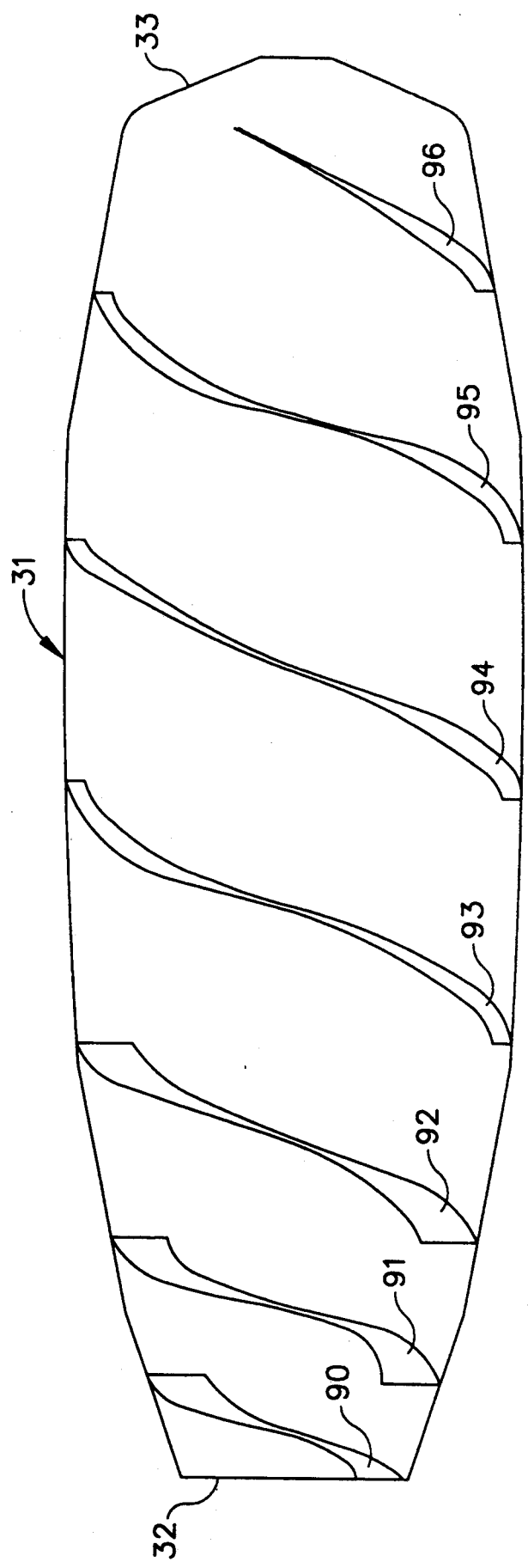
FIG. 11 is a simplified, semi-diagrammatic, cross sectional elevation of the reactor vessel of the present invention illustrating the single helical blade located therein.

FIG. 11 is a simplified, diagrammatic, longitudinal cross section of the reactor vessel 31. The reactor vessel has, affixed to its inside surface, a single helical blade generally indicated at 89. The blade 89 extends from the forward load/unload end 32 of the reactor vessel substantially to its rearward end 33. As viewed from the forward end 32, the reactor vessel is normally rotated in a clockwise direction by prime mover 41 during loading and processing. During unloading of the reactor vessel 31, the reactor vessel is generally rotated in a counterclockwise direction. The initial three or so convolutions 90, 91 and 92 have a radial height from the inside surface of reactor vessel 31 of about 10 inches, and are configured to assist in the loading and unloading operations of a cycle. The remaining convolutions 93, 94, 95 and 96 have a radial height from the inside surface of the reactor vessel 31 of about three inches. These convolutions serve to prevent compaction of the material being processed at the rear of the vessel. They also tend to fluff and softly move the material when the reactor vessel 31 is rotated during the processing portion of a cycle. While in the diagrammatic representation of FIG. 11 the blade 89 is shown having seven convolutions, more than seven convolutions may be provided, depending upon the size and capacity of the reactor vessel.

The reactor vessel 31 comprises a part of a substantially unattended, automated, composting environment. The manifold 67 and its pairs of arcuate aeration pipes 68 comprise a system by which an evenly balanced, soft, gentle fresh air stream of sufficient oxygen may be supplied to, and throughout, the organic mass to assure aerobic conditions for maximum aerobic microbial activity.

Figure 8:
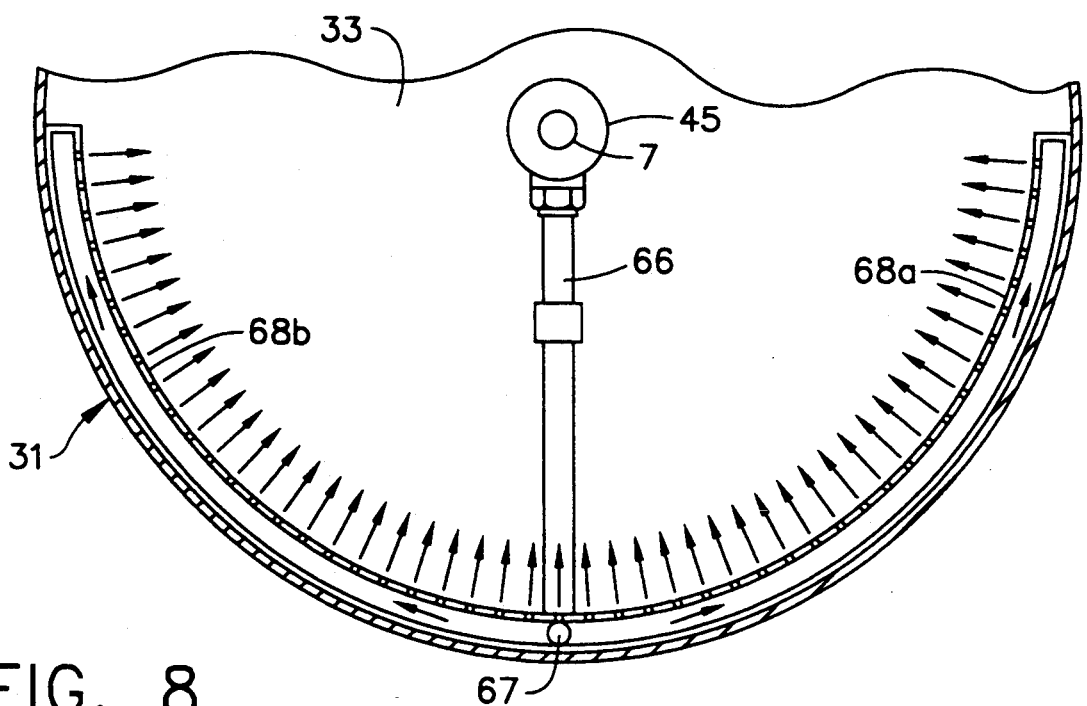
FIG. 8 is a fragmentary cross sectional view taken along section 8—8 of FIG. 5.

During the processing cycle, when rotation of the drum is not called for, it is preferable that the drum stops at its "at home" position illustrated in FIGS. 5, 6 and 8. The "at home" position is that position wherein the manifold 67 is at its lowermost point (as in FIGS. 5, 6 and 8). This assures that the manifold 67 and the pairs of arcuate aeration pipes 68 are located beneath the bed of material being processed. A typical lay line of the bed is indicated in broken lines in FIG. 5 at 97.

In order to assure that the reactor vessel 31 stops rotation at its "at home" position, an electronic sensor 98 is appropriately mounted exteriorly of the reactor vessel 31, as for example on pedestal 35. The rearward end 33 of the drum is provided with a cooperating sensor part 99. Sensor parts 98 and 99 are aligned when the reactor vessel 31 is in its "at home" position. Sensor 98 is provided with an input (not shown) to the process control computer 65.

When the drum is being rotated during processing in the above-noted clockwise direction, the material being processed will tend to accumulate and rise slightly on the left side of the reactor vessel, as viewed from its forward end 32. When the computer stops rotation with sensor elements 98 and 99 aligned, the hydraulic motor 41 is disengaged. The accumulation of the material being processed on the left side of the reactor vessel 31 will, by gravity, cause the reactor vessel to rotate in a counterclockwise direction until the reactor vessel is stopped in a balanced condition. This, however, will cause the sensor elements 98 and 99 to be out of alignment and the drum will not be in its "at home" position.

To correct this situation, the computer will cause the reactor vessel in the stopping process to rotate somewhat beyond the "at home" position in an effort to cause the reactor vessel 31 to roll back to and stop at its "at home" position with sensor elements 98 and 99 aligned. This action of the computer will continue until the right amount of overturn is achieved by artificial intelligence methods for the particular batch being processed. Each time the drum is rotated and stopped, the same artificial intelligence methods will be used, using the results of the previous overturn determination as a base line. The same procedure is performed by the process control computer 65 for each batch processed in the reactor vessel 31. The blower 71, the air injector 47, the hollow axle 37, the interface pipe 66, the manifold 67 and the pairs of arcuate pipes 68 provide air in such quantity as to assure sufficient oxygen for aerobic microbial activity and, as required, provide sufficient cool air for controlling temperature levels for various composting conditions. The fact that the blower 71 is a variable speed blower, enables narrow management of oxygen and temperature within and throughout the mass in reactor vessel 31.

On order to prevent the aeration holes in the arcuate pipe pairs 68 from becoming clogged with the material being processed during the composting cycle, blower 71 may be kept energized during rotation of the drum, so that when the plenum 67 and the arcuate aeration pipes pairs 68 are above the mass being treated, air purges the holes. Simultaneously, a short duration, high pressure, air purge blast (at about 150 psi) may be introduced at timed intervals to shake loose any leftover, stubborn debris in the aeration tube perforations. As indicated above, the flapper valve 78 will protect the blower 71 from these high pressure, short duration, blasts.

In response to results ascertained by the temperature monitor 64, the process control computer (being programmed to utilize artificial intelligence under the influence of rule-based logic), can signal the blower 71 to provide varied output volumes of air to affect cooling under high volume delivery or warming via low volume delivery.

Oxygen control, temperature control, reactor vessel rotation control and the like are based upon the material or "recipe" located within reactor vessel 31. The "rules" of the composting run are input after the reactor vessel has been loaded with raw materials, and just prior to assigning management of the reactor vessel 31 to its respective process control computer 65. A visual, graphic, live, display is available on the central computer monitor via data base management. This feature allows an operator to have access to on-line, real-time monitoring and, if required, to intervene during the progress of a given composting run or cycle.

In the practice of the present invention, a given mass of raw material, when properly formulated, can feasibly become a sufficiently stabilized humus in a period of about 72 hours, or less. To optimize the efficiency of the apparatus and to maximize processing throughput, it is important, during the cycle, to recognize when compost stability occurs. Since microbial activity during the peak demand phase of the composting cycle can deplete oxygen content within 12 to 15 minutes, corrective, responsive action must be taken. Typical, conventional composting monitoring, controls and material management generally cannot respond quickly and efficiently enough to the rapidly changing microbial environmental conditions and requirements.

The present invention provides an unattended, automated, composting environment capable of tracking the rate of microbial activity in an on-line, real-time mode, to determine the microbial oxygen uptake and carbon dioxide production throughout the composting cycle. The system of the present invention is capable of analyzing the trends and making responsive decisions, as well as detecting stabilization whenever overall oxygen consumption drops to a given level. In an unattended, automated environment, the present invention provides both apparatus and methodology for in-mass sampling of gasses from the solid materials. The rigid sensor wand 8a is so located that it can provide temperature information and gas samples from within and across the mass of material being treated. Resultant output signals from gas analyzer 63 and temperature monitor 64 are sent to the process control computer 65 of the particular reactor vessel 31 in question, for interpretation, regulation and storage. This has become an animated process of on-line respiration analysis and temperature analysis, and constitutes part of the automated management control and response system of the present invention. It would be within the scope of the invention to provide each reactor vessel 31 with more than one sensor wand 8a, connected to gas analyzer 63 and temperature monitor 64.

As indicated above, agitation of the composting materials should be based on valid evidence of a real, existing condition which warrants agitation. Conditions warranting agitation include subsiding oxygen demand due to nutrient deficiencies within the mass; temperatures exceeding maximum rules; and hot and cold spots sensed within the mass requiring equalization to maintain a narrow temperature range and to assure homogeneous conversion.

The apparatus of the present invention enables oxygen uptake concentrations to be passed to the process control computer 65. The analog signals from the gas analyzer 63 are digitalized and compared to standards (rules) stored in the process control computer memory, having been received from the central computer monitor. The amount of depletion over a given period of time determines the rate of oxygen consumption. High oxygen consumption in a short time span (i.e. 10%–15% oxygen levels within five minutes) tells the process control computer to turn on the air source to replenish oxygen throughout the mass. Oxygen degradation down to 15%–17% in three to five minutes indicates less oxygen uptake. Under these circumstances the process control computer will cause air to be delivered throughout the mass. The process control computer will also cause the reactor vessel 31 to be rotated, opening up pockets of nutrition. If the oxygen utilization goes back up, the composting cycle is incomplete. If oxygen utilization continues to be lazy, in all likelihood the composting cycle is finished.

In a somewhat similar fashion, analog temperature signals from the sensors on the sensor wand 8a are passed to the process control computer 65 from the temperature monitor 64. The signals are digitalized for testing against a standard (i.e. maximum temperature rules at various stages of the composting cycle for this recipe). If any standard (valid at a given time) is exceeded, the process control computer 65 will increase aeration and cause the reactor vessel 31 to rotate for agitation and hot air purging. This process continues until temperatures are stabilized within the required current range, or the composting cycle has been completed.

The analog temperature signals are sent to the temperature monitor 64 from different levels of the mass within the reactor vessel 31. The sensor wand 8a is so positioned that the temperature sensors are located within and across the mass. Each sensor temperature sent to the process control computer 65 is compared to other valid sensors within the mass. If one or more of the sensors drift outside an acceptable standard range such as 3°–5° F., or ±10%, the process control computer 65 will call for the drum to turn causing the mass to be moved and fluffed. This activity mixes the contents so that hot and cold spots in the composting mass are blended to equalize the temperature throughout the mass to achieve homogeneous conversion of the organic materials.

If the moisture level goes below the previously stated range, water may be added to the mass within the reactor vessel 31. In general, it has been found that this is seldom necessary. The nature of the reactor vessel is such that water within the mass vaporizes, rises, contacts the reactor vessel wall, condenses and drips back into the mass. As a consequence of this, the addition of water is seldom required.

As indicated above, an important feature of the apparatus of the present invention lies in the fact that completion of the composting process can be determined by sampling the oxygen content on line, on command, in real numbers and while the mass is still in the reactor vessel. Modifications may be made in the invention without departing from the spirit of it.

What is claimed is:

1. Apparatus for preparing stable humus from a batch of organic waste material of known recipe, said apparatus comprising a reactor vessel having a longitudinal axis, means for rotating said reactor vessel about said axis, a manifold assembly positioned within said reactor vessel for distributing variable amounts of air within and throughout said reactor vessel to control batch temperature and oxygen levels, at least one stationary wand within said reactor vessel and extending transversely of said reactor vessel in a plane perpendicular to said vessel axis, said wand having a plurality of temperature sensors and a plurality of gas inlets evenly spaced therealong, and a control means for calling for, collecting, monitoring and storing sensed temperatures from said temperature sensors and for calling for, collecting and analyzing gas samples from said gas inlets, and storing the results of said analyzing of said gas samples, and for distributing air through said manifold assembly and/or actuating said reactor vessel rotating means in response to said monitored temperatures and said analysis of said gas samples to optimize temperature and oxygen levels throughout the various stages of humus production and for ascertaining when a stable humus has been achieved.

2. The structure claimed in claim 1 wherein said manifold assembly comprises a manifold extending longitudinally of the reactor vessel and affixed to the inside surface thereof, a plurality of pairs of arcuate aeration pipes being evenly spaced along said manifold, said aeration pipes of each pair extending from opposite sides of said manifold transversely of said reactor vessel and along the inside surface thereof, each of said arcuate aeration pipes having a first end connected directly to said manifold and a second capped end, each of said arcuate pipes having perforations therealong so configured and spaced as to provide substantially equal amounts of air to said batch throughout the length of said aeration pipe, and a blower, said blower having an outlet operatively attached to said manifold.

3. The apparatus claimed in claim 1 wherein said means to rotate said reactor vessel comprises a prime mover operatively connected to said reactor vessel, said reactor vessel being rotatable in a first direction by said prime mover for loading said batch therein and for fluffing said batch therein, said reactor vessel being rotatable in the opposite direction by said prime mover for removal of said batch therefrom.

4. The structure claimed in claim 1 including a central computer monitor means for storing temperature and oxygen level information from said control unit means, for providing a visual graphic, live display of the humus preparing process at any time, for providing said control unit means with rules to follow based upon the recipe of said batch, and for enabling access to on-line, real-time monitoring and intervention, if required.

5. The structure claimed in claim 1 including said reactor vessel and at least one additional reactor vessel substantially identical to said reactor vessel and having a substantially identical control unit means, a substantially identical temperature sensing and gas sample obtaining wand, a substantially identical reactor vessel rotating means and a substantially identical air distributing manifold assembly, a central computer monitor means for storing temperature and oxygen level information from said control unit means of each of said reactor vessel and said at least one additional reactor vessel, for providing a visual, graphic, live display of the humus preparing process in each of said reactor vessel and said at least one additional reactor vessel at any time, for providing said control unit means of each of said reactor vessel and said at least one additional reactor vessel with rules to follow based upon the recipe of said batches therein and for enabling with respect to each of said reactor vessel and said at least one additional reactor vessel access to on-line, real-time monitoring and intervention if required.

6. The structure claimed in claim 1 wherein said apparatus comprises a substantially unattended, automated system.

7. The structure claimed in claim 1 wherein said control unit means comprises a temperature monitor, a gas analyzer and a process control computer means, said temperature sensors on said sensor wand being individually connected by leads to said temperature monitor, said gas inlets on said sensor wand being individually connected by tubes to said gas analyzer, said temperature monitor and said gas analyzer having outputs to said process control computer means.

8. The structure claimed in claim 2 wherein said blower is a variable speed blower controlled by outputs from said control unit means.

9. The structure claimed in claim 3 wherein said prime mover is controlled by outputs from said control unit means.

10. The structure claimed in claim 7 wherein said manifold assembly comprises a manifold extending longitudinally of the reactor vessel and affixed to the inside surface thereof, a plurality of pairs of arcuate aeration pipes being evenly spaced along said manifold, said aeration pipes of each pair extending from opposite sides of said manifold transversely of said reactor vessel and along the inside surface thereof, each of said arcuate aeration pipes having a first end connected directly to said manifold and a second capped end, each of said arcuate pipes having perforations therealong so configured and spaced as to provide substantially equal amounts of air to said batch throughout the length of said aeration pipe, and a blower, said blower having an outlet operatively attached to said manifold.

11. The apparatus claimed in claim 10 wherein said means to rotate said reactor vessel comprises a prime mover operatively connected to said reactor vessel, said reactor vessel being rotatable in a first direction by said prime mover for loading said batch therein and for fluffing said batch therein, said reactor vessel being rotatable in the opposite direction by said prime mover for removal of said batch therefrom.

12. The structure claimed in claim 11 including a central computer monitor means for storing temperature and oxygen level information from said process control computer means, for providing a visual, graphic, live display of the humus preparing process at any time, for providing the process control computer means with rules to follow based upon the recipe of said batch, and for enabling access to on-line, real-time monitoring and intervention, if required.

13. The structure claimed in claim 11 including said reactor vessel and at least one additional reactor vessel substantially identical to said reactor vessel and having a substantially identical process control computer, a substantially identical temperature sensing and gas sample obtaining wand, a substantially identical reactor vessel rotating means and a substantially identical air distributing manifold assembly, a central computer monitor means for storing temperature and oxygen level information from said process control computer of each of said reactor vessel and said at least one additional reactor vessel, for providing a visual, graphic, live display of the humus preparing process in each of said reactor vessel and said at least one additional reactor vessel at any time, for providing the process control computer of each of said reactor vessel and said at least one additional reactor vessel with rules to follow based upon the recipe of said batches therein and for enabling with respect to each of said reactor vessel and said at least one additional reactor vessel access to on-line, real-time monitoring and intervention, if required.

14. The structure claimed in claim 12 wherein said apparatus comprises a substantially unattended, automated system.

15. The structure claimed in claim 13 wherein said apparatus comprises a substantially unattended, automated system.

16. The structure claimed in claim 12 wherein said process control computer has control outputs for said variable speed blower and said prime mover.

17. The structure claimed in claim 10 including a second source of air at a pressure higher than said air from said blower, means actuated by said process control computer means for introducing said air from said second source into said manifold and said arcuate aeration pipes to purge said perforations of said aeration pipes.

18. The structure claimed in claim 10, including a home position for said reactor vessel wherein said manifold is at its lowermost position, a sensor assembly having an output signal to said process control computer when said reactor vessel is in said home position, and means within said process control computer to disengage said prime mover at a position beyond said home position such that said home position of said reactor vessel is achieved by rollback of said reactor vessel seeking a balanced condition.

* * * * *